United States Patent
Fujioka

[11] Patent Number: 5,917,470
[45] Date of Patent: Jun. 29, 1999

[54] COMMUNICATION CONFERENCE METHOD AND COMMUNICATION CONFERENCE TERMINAL

[75] Inventor: Susumu Fujioka, Zama, Japan

[73] Assignee: Ricoh Company, Ltd., Tokyo, Japan

[21] Appl. No.: 08/566,997

[22] Filed: Dec. 4, 1995

[30] Foreign Application Priority Data

Dec. 20, 1994 [JP] Japan .................................. 6-334679
Mar. 31, 1995 [JP] Japan .................................. 7-153786

[51] Int. Cl.⁶ ...................................................... G09G 5/00

[52] U.S. Cl. ........................... 345/127; 345/129; 345/130; 345/330

[58] Field of Search .............................. 345/1, 2, 3, 127, 345/129, 130, 132, 330, 333; 348/13, 15, 16, 17, 18; 379/96

[56] References Cited

U.S. PATENT DOCUMENTS

| | | | |
|---|---|---|---|
| 4,400,724 | 8/1983 | Fields | 348/15 |
| 5,475,808 | 12/1995 | Kobayashi | 345/3 |
| 5,508,713 | 4/1996 | Okouchi | 345/1 |
| 5,758,110 | 5/1998 | Boss et al. | 345/330 |

*Primary Examiner*—Matthew Luu
*Attorney, Agent, or Firm*—Oblon, Spivak, McClelland, Maier & Neustadt, P.C.

[57] ABSTRACT

In a communication conference method which uses display units in order to display handwritten inputs, handwritten input signals are transmitted between first and second terminals to perform a communication conference session. Information concerning numbers of pixels of the display units are exchanged between the first and second terminals. The next step is to set a common display area used in the communication conference session. The common display area has the smaller of the number of pixels of the first terminal and the number of pixels of the second terminal.

14 Claims, 18 Drawing Sheets

FIG. 6

| | | | | | (OCTET) | | | |
|---|---|---|---|---|---|---|---|---|
| | 1 | 2 | 3 | 4 | 5 | 6 | 7 | 8 |
| 0 | N 1 | 0 | 0 | 1 | 1 | 0 | 1 | 1 |
| 1 | 0 | 1 | A | E | C 1 | C 2 | C 3 | C 4 |
| 2 | N 2 | 0 | 0 | 1 | 1 | 0 | 1 | 1 |
| 3 | 0 | 1 | A | E | C 1 | C 2 | C 3 | C 4 |
| 4 | N 3 | 0 | 0 | 1 | 1 | 0 | 1 | 1 |
| 5 | 1 | 1 | A | E | C 1 | C 2 | C 3 | C 4 |
| 6 | N 4 | 0 | 0 | 1 | 1 | 0 | 1 | 1 |
| 7 | 0 | 1 | A | E | C 1 | C 2 | C 3 | C 4 |
| 8 | N 5 | 0 | 0 | 1 | 1 | 0 | 1 | 1 |
| 9 | 1 | 1 | A | E | C 1 | C 2 | C 3 | C 4 |
| 10 | L 1 | 0 | 0 | 1 | 1 | 0 | 1 | 1 |
| 11 | 1 | 1 | A | E | C 1 | C 2 | C 3 | C 4 |
| 12 | L 2 | 0 | 0 | 1 | 1 | 0 | 1 | 1 |
| 13 | L 3 | 1 | A | E | C 1 | C 2 | C 3 | C 4 |
| 14 | T E A | 0 | 0 | 1 | 1 | 0 | 1 | 1 |
| 15 | R | 1 | A | E | C 1 | C 2 | C 3 | C 4 |

(FRAME) on left axis

FIG. 7

| 9 | 10 | 11 | 12 | 13 | 14 | 15 | 16 | (OCTET) |
|---|---|---|---|---|---|---|---|---|
| b 0 | b 3 | b 2 | b 1 | b 5 | b 4 | b 6 | b 7 | (EVEN FRAME) |
| p 2 | p 1 | p 0 | p 4 | p 3 | p 5 | p 6 | p 7 | (ODD FRAME) |

→ TIME

BL1

BL2

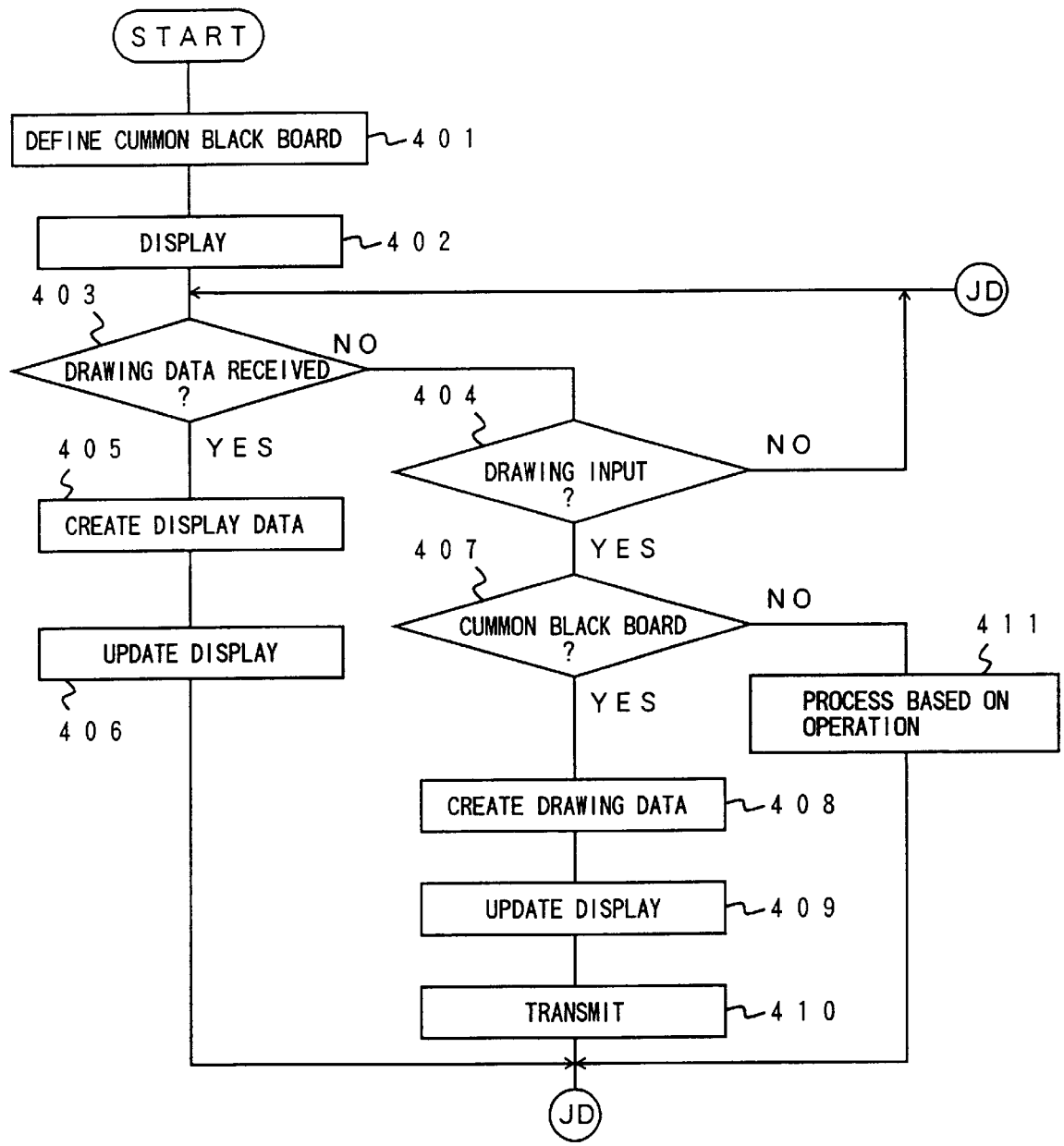

COMMUNICATION CONFERENCE METHOD AND COMMUNICATION CONFERENCE TERMINAL

BACKGROUND OF THE INVENTION

1. Field of the Invention

The present invention generally relates to a conference performed via a communications network, and more particularly to a communication conference method and communication conference terminal which use a handwritten input display device and carry out a communication conference session with a remote terminal by transferring handwritten input signals.

2. Description of the Related Art

Generally, a communication conference device such as a video conference communication terminal exchanges handwritten input information and test information with respect to a remote terminal by displaying handwritten input data and text image data on a liquid crystal display having a large screen. In this way, a given communication conference session is carried out.

Conventionally, such a communication conference session is carried out with respect to a specific communication conference terminal. Hence, the communication conference terminals utilize the same number of pixels of the liquid crystal display used to display, for example, handwritten input information. Hence, the own terminal and the remote terminal have the same size of an area for which handwritten inputting is carried out and the number of pixels in the display area. In other words, there is no possibility that the terminals communicating with each other use different display sizes and/or different numbers of pixels.

However, recently, general-use data processing devices such as personal computers other than the terminals specifically used for communication conference have been capable of carrying out communication conference sessions by equipping these processing devices with hardware and software for realizing the functions of the communication conference terminal and connecting to the processing devices an audio input/output device for inputting and outputting audio signals and a video camera device and a video monitor device for inputting and outputting images.

The above-mentioned data processing devices may have different number of pixels displayable on the respective display devices (which may be CRT display devices). Hence, the data processing devices may have different numbers of pixels from the remote data processing devices. In this case, appropriate handwritten inputting and displaying cannot be carried out.

SUMMARY OF THE INVENTION

It is a general object of the present invention to overcome the above disadvantage.

A more specific object of the present invention is to provide a communication conference method and a communication conference terminal capable of carrying out appropriate communication conference sessions even when terminals communicating with each other have different numbers of displayable pixels.

The above objects of the present invention are achieved by a communication conference method which uses display units in order to display handwritten inputs, wherein handwritten input signals are transmitted between first and second terminals to perform a communication conference session, the communication conference method comprising the steps of:

exchanging information concerning numbers of pixels of the display units between the first and second terminals; and setting a common display area used in the communication conference session, the common display area having the smaller of the number of pixels of the first terminal and the number of pixels of the second terminal.

The above objects of the present invention are achieved by a communication conference method which uses display units in order to display handwritten inputs, wherein handwritten input signals are transmitted between first and second terminals to perform a communication conference session, the communication conference method comprising the steps of:

exchanging information concerning numbers of pixels of the display units between the first and second terminals;

setting a common display area used in the communication conference session, the common display area having the smaller of the number of pixels of the first terminal and the number of pixels of the second terminal;

enlarging, at the first terminal when the number of pixels of the display unit of the first terminal is larger than the number of pixels of the common display area, coordinates of the handwritten input signal received from the second terminal at a ratio of the number of pixels of the common display area and the number of pixels of the display unit of the first terminal; and reducing coordinates of the handwritten input signal to be transmitted to the second terminal from the first terminal at an inverse number of the ratio.

The above objects of the present invention are achieved by a communication conference method which uses display units in order to display handwritten inputs, wherein handwritten input signals are transmitted between first and second terminals to perform a communication conference session, the communication conference method comprising the steps of:

exchanging information concerning numbers of pixels of the display units between the first and second terminals;

setting a common display area used in the communication conference session, the common display area having the larger of the number of pixels of the first terminal and the number of pixels of the second terminal;

reducing, at the first terminal when the number of pixels of the display unit of the first terminal is smaller than the number of pixels of the common display area, coordinates of the handwritten input signal received from the second terminal at a ratio of the number of pixels of the common display area and the number of pixels of the display unit of the first terminal; and enlarging coordinates of the handwritten input signal to be transmitted to the second terminal from the first terminal at an inverse number of the ratio.

The above objects of the present invention are achieved by a communication conference method which uses display units in order to display handwritten inputs, wherein handwritten input signals are transmitted between first and second terminals to perform a communication conference session, the communication conference method comprising the steps of:

setting, at the first and second terminals, a common display area having a predetermined number of pixels; and performing a display of handwritten inputs on common display areas of the display units of the first and second terminals.

The above objects of the present invention are achieved by a communication conference terminal which uses a display unit in order to display handwritten inputs, wherein handwritten input signals are transmitted between the communication conference terminal and a remote terminal to perform a communication conference session, the communication conference terminal comprising:

first means for exchanging information concerning numbers of pixels of the display units between the communication conference terminal and the remote terminal; and second means for setting a common display area used in the communication conference session, the common display area having the smaller of the number of pixels of the communication conference terminal and the number of pixels of the remote terminal.

The above objects of the present invention are achieved by a communication conference terminal which uses a display unit in order to display handwritten inputs, wherein handwritten input signals are transmitted between the communication conference terminal and a remote terminal to perform a communication conference session, the communication conference terminal comprising:

first means for exchanging information concerning numbers of pixels of the display units between the communication conference terminal and the remote terminal;

second means for setting a common display area used in the communication conference session, the common display area having the smaller of the number of pixels of the communication conference terminal and the number of pixels of the remote terminal;

third means for enlarging, at the communication conference terminal when the number of pixels of the display unit of the communication conference terminal is larger than the number of pixels of the common display area, coordinates of the handwritten input signal received from the remote terminal at a ratio of the number of pixels of the common display area and the number of pixels of the display unit of the communication conference terminal; and fourth means for reducing coordinates of the handwritten input signal to be transmitted to the remote terminal from the communication conference terminal at an inverse number of the ratio.

The above objects of the present invention are achieved by a communication conference terminal which uses a display unit in order to display handwritten inputs, wherein handwritten input signals are transmitted between the communication conference terminal and a remote terminal to perform a communication conference session, the communication conference terminal comprising:

first means for exchanging information concerning numbers of pixels of the display units between the communication conference terminal and the remote terminal;

second means for setting a common display area used in the communication conference session, the common display area having the larger of the number of pixels of the communication conference terminal and the number of pixels of the remote terminal;

third means for reducing, at the communication conference terminal when the number of pixels of the display unit of the communication conference terminal is smaller than the number of pixels of the common display area, coordinates of the handwritten input signal received from the remote terminal at a ratio of the number of pixels of the common display area and the number of pixels of the display unit of the communication conference terminal; and fourth means for enlarging coordinates of the handwritten input signal to be transmitted to the remote terminal from the communication conference terminal at an inverse number of the ratio.

The above objects of the present invention are achieved by a communication conference terminal which uses a display unit in order to display handwritten inputs, wherein handwritten input signals are transmitted between the communication conference terminal and a remote terminal to perform a communication conference session, the communication conference terminal comprising:

first means for setting a common display area having a predetermined number of pixels, the common display area being common to the communication conference terminal and the remote terminal; and second means for performing a display of handwritten inputs on the common display area of the display unit of the communication conference terminal.

BRIEF DESCRIPTION OF THE DRAWINGS

Other objects, features and advantages of the present invention will become more apparent from the following detailed description when read in conjunction with the accompanying drawings, in which:

FIG. 6 is a diagram schematically showing an example of a frame alignment signal;

FIG. 7 is a diagram schematically showing an example of a bit allocation signal;

FIG. 22 is a flowchart of a further example of the display process.

DESCRIPTION OF THE PREFERRED EMBODIMENTS

Figure 1:
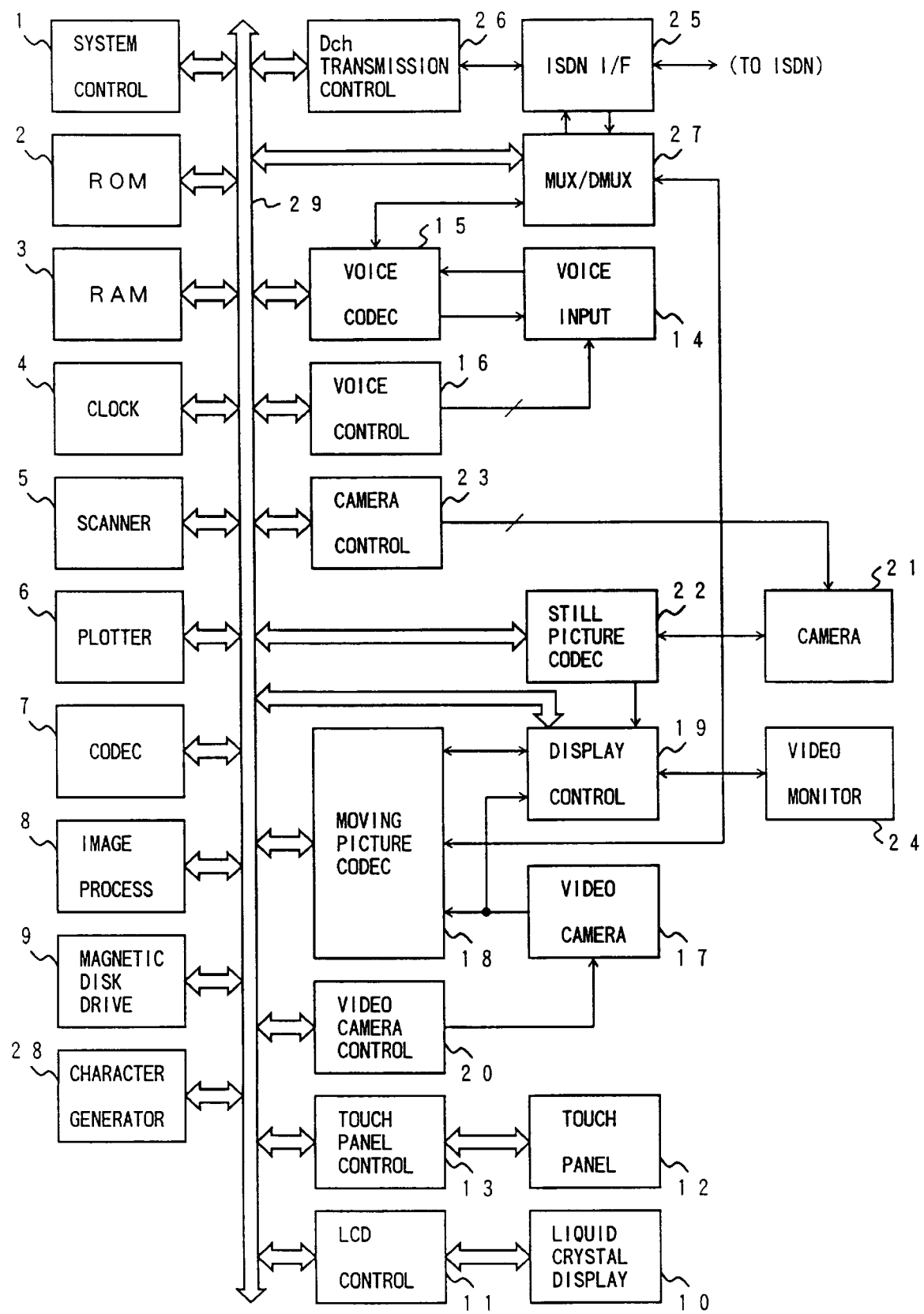
FIG. 1 is a block diagram of a video conference communication terminal according to an embodiment of the present invention.

FIG. 1 is a block diagram of a video conference communication terminal according to an embodiment of the present invention. The terminal uses, as a transmission line, the basic interface of the ISDN (Integrated Services Digital Network). The terminal is equipped with an audio information communication function, a moving image information communication function, a still picture information communication function, a facsimile communication function, a tele-writing function and a multiplex communication function for multiplexing the above functions. The terminal is connected to the basic interface of the ISDN and performs data communications via two information channels (B channels).

A system controller 1 performs various control processes. Examples of these control processes are a control process for controlling each part of the present video conference communication terminal, a process for the upper layers in the video conference communication, a process for executing various applications with which the terminal is equipped, and a help display process for processing help requests from the users.

A ROM (Read Only Memory) 2 stores parts of control process programs executed by the system controller 1 and a variety of data necessary to execute the control process programs. A RAM (Random Access Memory) 3 functions as a work area of the system controller 1.

A clock circuit 4 is used to output the present date and time. A scanner 5 is used to optically read a text (original) at a given resolution level and output image signals. A plotter 6 records images on papers at a given resolution level. A coding/decoding unit (codec) 7 codes and compresses the image signal obtained by reading through the scanner in a coding method for the facsimile function, and decompresses and decodes the coded and compressed image signal to thereby reproduce the original image information. An image processing unit 8 performs various imaging processes such as a magnifying process for image data and a resolution level changing process. A magnetic disk drive 9 stores system software, a plurality of application programs and a large amount of user data.

A liquid crystal display unit 10 is used as a display in the tele-writing communication function as well as a display when the operator (user) operates the video conference communication terminal. An LCD (Liquid Crystal Display) controller 11 controls the display operation of the liquid crystal display unit 10.

A touch panel unit 12 is provided on the display screen of the liquid crystal display unit 10, and outputs data indicating the coordinates of a touched point and data relating to a touched state. A touch panel controller 13 controls the operation of the touch panel unit 12.

An audio input/output unit 14 inputs voices (analog acoustic signals) for speech communications via a microphone and outputs voices (analog acoustic signals) via a speaker. The analog acoustic signal input via the microphone is output to a speech codec 15. The analog acoustic signal to be output to the speaker via the audio input/output unit 14 is given from the speech codec 15. The speech codec 15 performs a signal converting process for analog signals/digital data directed to transmit digital speech data via the B channels of the ISDN. A speech controller 16 controls the audio input/output unit 14.

A video camera unit 17 inputs a moving image on the user side of the video conference communication terminal. A moving image signal output from the video camera unit 17 is applied to a video signal input terminal of a moving image codec 18 and a moving image signal input terminal of a display controller 19. A video camera controller 20 controls operations of the video camera unit 17, such as photographing ON/OFF, zoom-in/zoom-out and pan.

The moving image codec 18 performs the following processes. The codec 18 converts a moving image signal in the analog NTSC (National Television System Committee) formation input from the video camera unit 17 into corresponding moving picture data in the digital formation. The codec 18 converts the moving picture data thus obtained into moving picture data in the CIF formation, and codes and compresses the above moving picture data by the ITU-T recommendation H. 261 coding process to thereby generate coded and compressed moving picture information. The disclosure of the ITU-T recommendation H. 261 is hereby incorporated by reference. The codec 18 converts coded and compressed moving picture information into original moving picture information in the CIF formation. The codec 18 converts the moving picture data in the CIF formation into moving picture data in the NTSC formation, and performs a digital-to-analog converting operation on the moving picture data thus obtained. In this way, the original moving picture signal in the analog NTSC formation can be reproduced.

All documents which describe the above formations are hereby incorporated by reference.

A camera unit 21 takes a still picture. An analog NTSC signal (a still-picture signal) output from the camera unit 21 is applied to a still-picture codec 22.

The still-picture codec 22 performs an analog-to-digital converting operation on the still-picture signal from the camera unit 21, and codes and compresses the digital still-picture signal by a predetermined coding process (for example, JPEG method). Further, the still-picture codec 22 decodes a coded and compressed still-picture signal to thereby retrieve the original still-picture signal. The still-picture signal input via the camera unit 21 or obtained by the decoding is output to a still-picture signal input terminal of the display controller 19. A camera controller 23 controls given controls of the camera unit 21, such as photographing ON/OFF and zoom-in/zoom-out.

The display controller 19 controls the display of a video monitor unit 24 including the display content to be displayed thereon. According to an instruction from the system controller 1, the display controller 19 forms display picture information concerning the moving picture signal input from the video camera unit 17 or the moving picture codec 18 and display picture information concerning the still-picture signal from the still-picture codec 22. Then, the display controller 19 arbitrarily combines the respective display picture information together and thereby forms a display picture to be displayed on the video monitor unit 24.

An ISDN interface circuit 25 is connected to the ISDN and has a signal processing function for layer 1 of the ISDN and a function of unifying and separating the signal transmitted via the D channel and signals via the two B channels. The signal via the D channel communicates with a D-channel transmission controller 26, and the two B-channel signals communicate with a multiplexing/demultiplexing unit 27.

The D-channel transmission controller 26 is equipped with a signal processing function for layer 2 of the D channel and a call control processing function for making a call connection to and releasing one or two B channels.

The multiplexer/demultiplexer unit 27 multiplexes data relating to a plurality of media transmitted via the B channels, such as speech data, moving picture data and general-use data (data other than still-picture data). Then, the multiplexer/demultiplexer unit 27 forms frame data defined in the ITU-T recommendation H. 221 from the multiplexed data, and sends it to the transmission line. Further, the multiplexer/demultiplexer unit 27 demultiplexes frame data received from the transmission line and thus reproduces data of the respective media multiplexed in the frame data. The multiplexer/demultiplexer unit 27 transmits speech data to the speech codec 15 and receives speech data therefrom. The multiplexer/demultiplexer unit 27 transmits moving picture data to the moving picture codec 18 and receives moving picture data therefrom. The multiplexer/demultiplexer unit 27 transmits general-use data to the system controller 1 and receives general-use data therefrom.

A character generator 28 generates data which is a gather of dots (font) forming a figure and/or a character when displaying the figure and/or character on the liquid crystal display unit 10.

To an internal bus 29, there are connected the system controller 1, the ROM 2, the RAM 3, the clock circuit 4, the scanner 5, the plotter 6, the codec 7, the image processing unit 8, the magnetic disk drive 9, the LCD display controller 11, the touch panel controller 13, the speech codec 15, the speech controller 16, the moving picture codec 18, the display controller 19, the video camera controller 20, the camera controller 23, the D-channel transmission controller 26, the multiplexer/demultiplexer 27, and the character generator 28. Data transmissions between the above constituent elements are carried out mainly via the internal bus 29.

Figure 2:
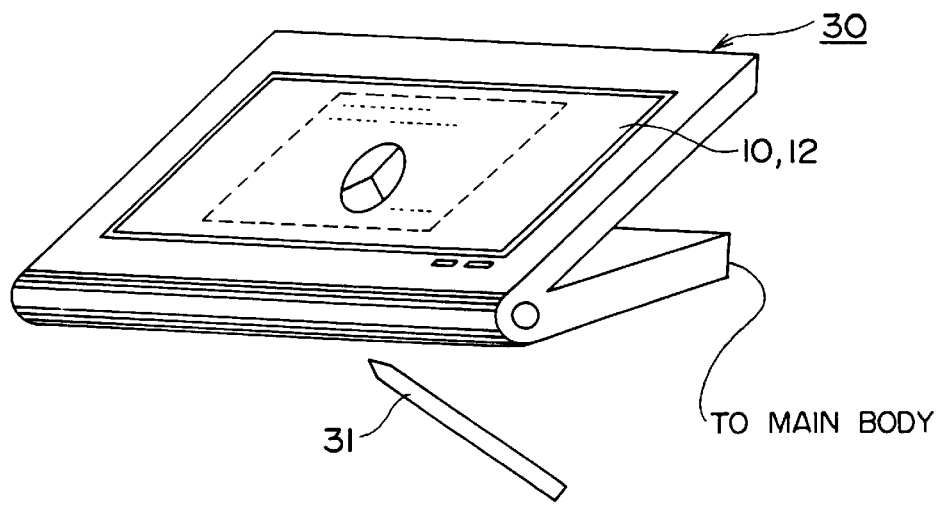
FIG. 2 is a schematically perspective view of part of an operation display unit of the terminal shown in FIG. 1.

FIG. 2 shows an example of an operation display unit 30 of the video conference communication terminal shown in FIG. 1.

The operation display unit 30 is equipped with the liquid crystal display unit 10 and the touch panel unit 12 provided on the display screen of the liquid crystal display unit 10. A touch pen 31 is used to make a touch operation on the operation plane of the touch panel unit 12.

Figure 3:
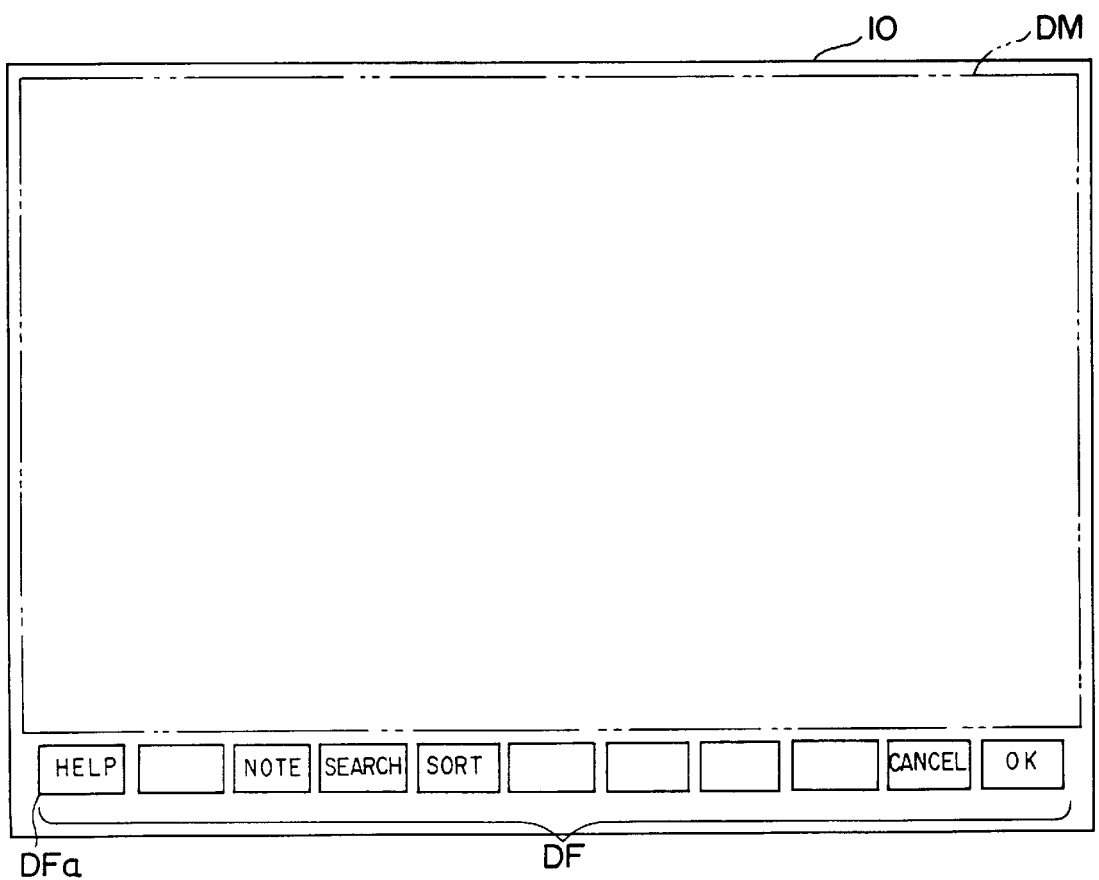
FIG. 3 is a view schematically showing an outline of a display screen.

As shown in FIG. 3, the display screen of the liquid crystal display unit 10 is segmented mainly into an information display part DM and a function key display part DF. Operation guidance information and a tele-writing drawing are displayed on the information display part DM. The contents of the general-use key operations are displayed on the function key display part DF. A help key DFa for making a help screen displayed is provided as a special key of the function key display part DF.

Hence, when the user performs the touch operation on the help key DFa of the function key display part DF by means of the touch pen 31, a help screen can be displayed which corresponds to the state of execution of an application being executed in the video conference communication terminal at that time.

Similarly, the user can make execution of a desired application and selection of a desired function by appropriately operating related display items (soft keys) on the function key display part DF.

The display items displayable on the function key display part DF may be changed to appropriate items on the basis of the kind of the application being executed in the video conference communication terminal and the state of execution of the application. The user can feel the key operation more comfortably.

The video conference communication terminal transmits and receives, in the B channels, data in the multiframe format defined in the ITU-T recommendation H. 221, the disclosure of which is hereby incorporated by reference.

Figure 4:
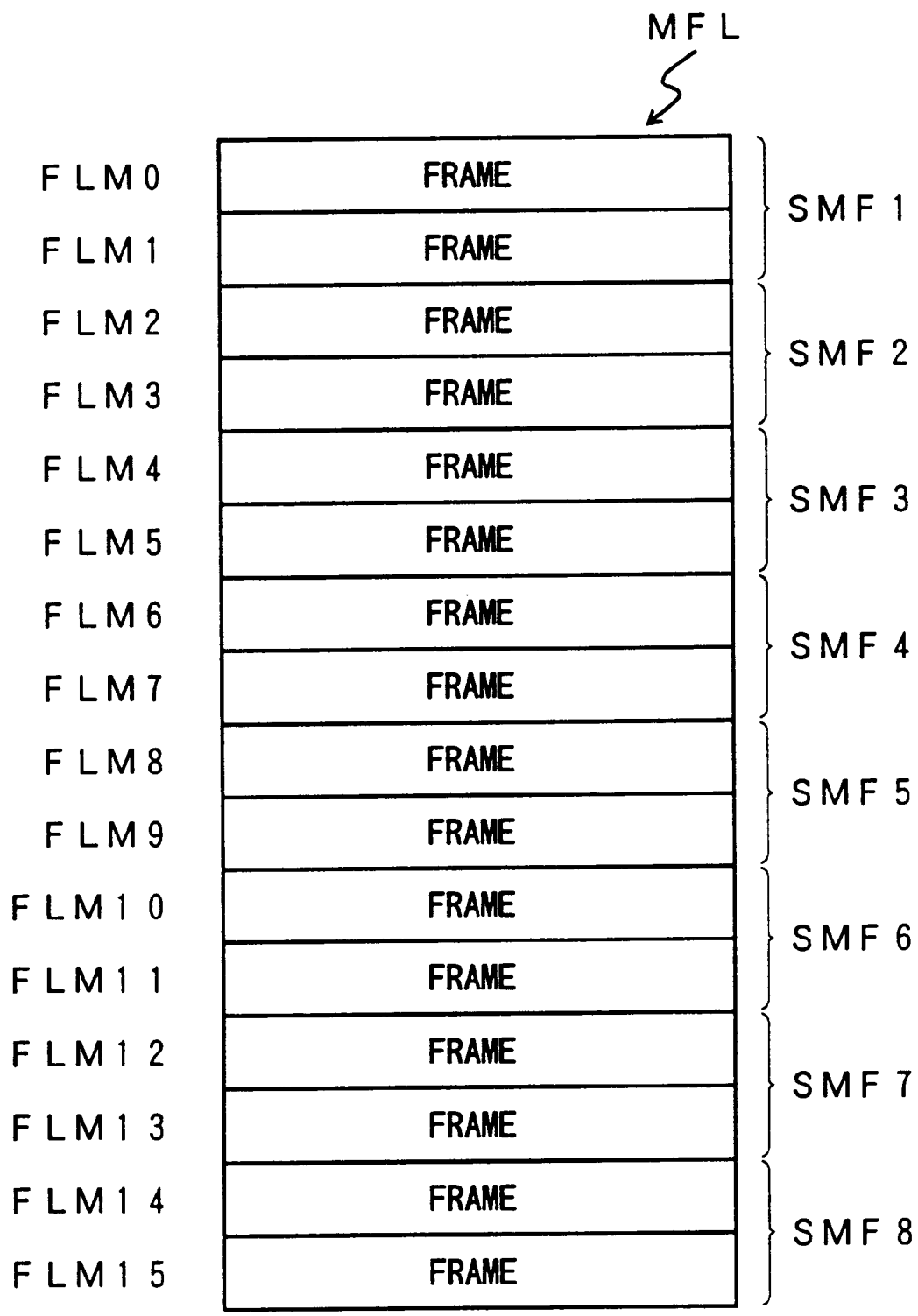
FIG. 4 is a diagram of an example of the frame structure of a multiframe.

As shown in FIG. 4, one multiframe MFL includes eight sub-multiframes SMF1 through SMF8. Each of the sub-multiframes SMF1 through SMF8 includes two frames. That is, one multiframe MFL includes 16 frames FLM0 through FLM15.

Figure 5:
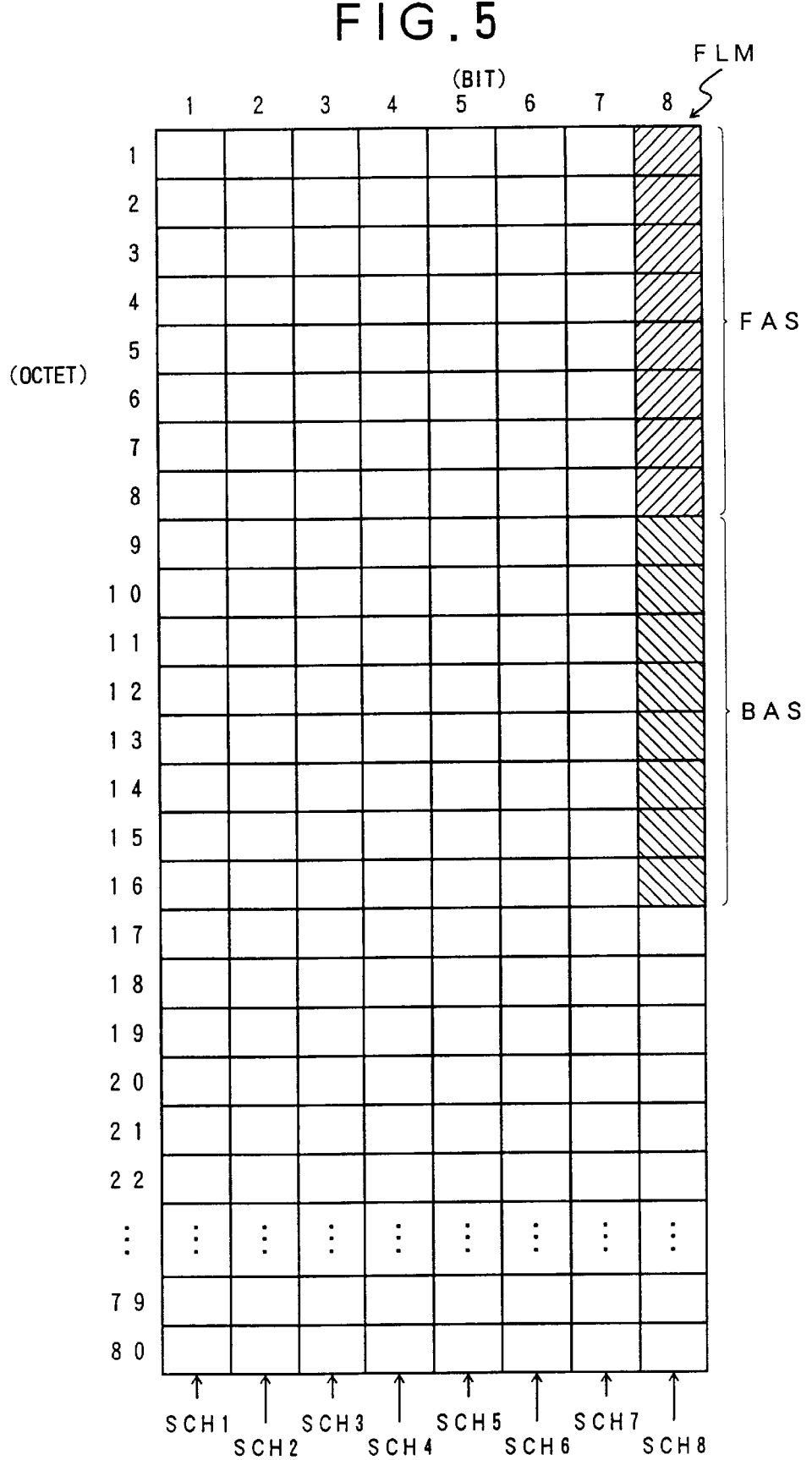
FIG. 5 is a diagram schematically showing an example of the signal structure of one frame.

As shown in FIG. 5, each of the frames FLM0 through FLM15 includes data equal to 80 octets, and the respective bit positions obtained by arranging the 80 octets in the bit order form sub-channels SCH1 through SCH8.

The eighth bits of the first through eighth octets form a frame alignment signal FAS, and the eighth bits of the ninth through sixteenth octets form a bit rate allocation signal BAS. Data of a cryptography channel used to transmit key information for scrambling data for cryptography may be placed in the sub-channels SCH8 of the seventeenth through twenty fourth octets (option).

As described above, the frame alignment signal FAS includes eight bits respectively included in the frames FLM0 through FLM15, and the bit allocation thereof is made on the multiframe MFL base, as shown in FIG. 6.

That is, a horizontal synchronizing signal formed of an eight-bit data pattern "00110111" are respectively arranged in the second through eigths octets of the even-numbered frames FLM0, FLM2, . . . FLM14 and the second octets of the subsequent odd-numbered frames FLM1, FLM3, . . . , FLM15. A vertical synchronizing signal formed of a six-bit data pattern "001011" is arranged in the first octets of the odd-numbered frames FLM1, FLM3, . . . , FLM11.

By detecting the horizontal synchronizing signal and the vertical synchronizing signal, synchronization of one multiframe MFL can be detected.

Bits N1, N2, N3, N4 and N5 of the first octets of the zeroth, second, fourth, sixth and eighth frames are used to indicate a multiframe number. Out of these bits, bit N5 is used to indicate whether or not the multiframe number is used. Since the data used for the multiframe number consists of four bits, the multiframe number serially changes between 0 and 15, and the same multiframe number appears every 16 multiframes.

Bits L1, L2 and L3 of the first octets of the tenth, twelfth and thirteenth frames are used to display a connection number which indicates a sequence related to a connection to the B channel out of the currently used B channels via which that frame is being carried. A bit Rl of the first octet of the fifteenth frame is reserved (booked) for a future recommendation, and a binary zero is written therein.

A bit TEA of the first octet of the fourteenth frame is used to indicate that a data transmission cannot be performed due to an internal fault of the data terminal. Bits A of the third octets of the odd-numbered frames FLM1, FLM3, . . . FLM15 are used to indicate whether the frame synchronization or multiframe synchronization has been established or indicate whether an out-of-synchronization has occurred.

Bits C1, C2, C3 and C4 of the fifth, sixth, seventh and eighth octets of the odd-numbered frames FLM1, FLM3, . . . , FLM15 are used to indicate a CRC code to be referred to for detecting a data error (that is, detecting the quality of the transmission line) of two consecutive frames (that is, sub-multiframe). Bits E of the fourth octets of the odd-numbered frames FLM1, FLM3, . . . , FLM15 are used to indicate that a transmission error has been detected on the receive side.

As to the bit rate allocation signal BAS, as shown in FIG. 7, eight-bit data indicating a capability BAS or a BAS command is allocated in the even-numbered frames FLM0, FLM2, . . . , FLM14. A double error correcting code for correcting an error of the value of the capability BAS or BAS command sent in the immediately prior frame is allocated in the odd-numbered frames FLM1, FLM3, . . . , FLM15.

Figure 8:
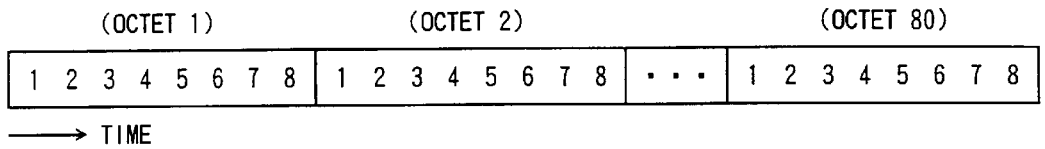
FIG. 8 is a diagram schematically showing an order of transmitting of signals.

Data of the multiframe MFL is transmitted in the frame-number order. As shown in FIG. 8, each of the frames FLM0–FLM15 is transmitted in the octet order (from the first octet to the eightieth octet). The first bit of each of the octets is transmitted first.

That is, the first bit of the first octet of each of the frames FLM0–FLM15 is transmitted first, and the eighth bit of the eightieth octet thereof is transmitted lastly.

Figure 9:
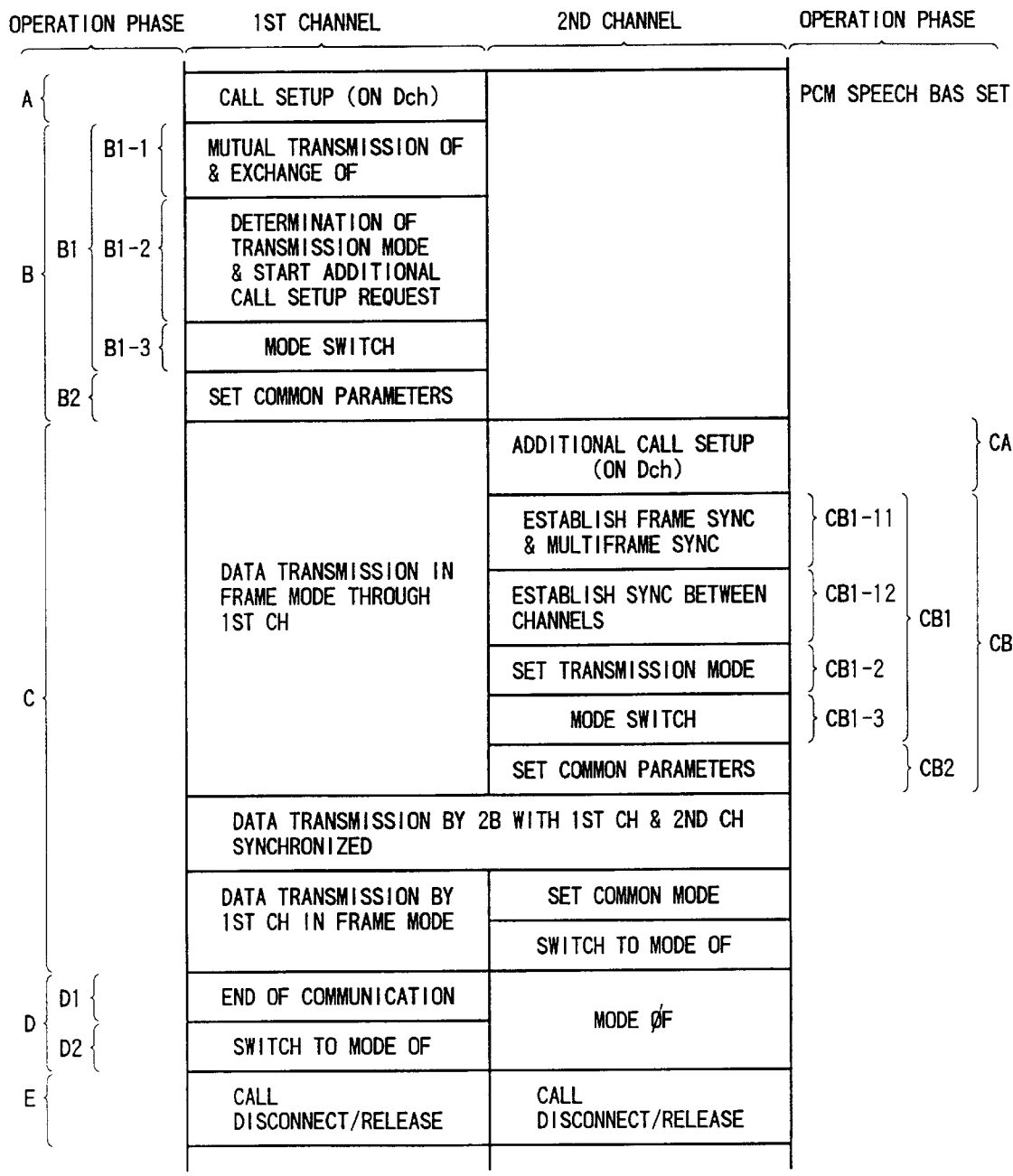
FIG. 9 is a time chart of a general procedure conforming to ITU-T recommendation H. 242, the disclosure of which is hereby incorporated.

FIG. 9 shows a general sequence of the TIU-T recommendation H. 242 applied as a transmission control sequence executed when an audio visual terminal such as the video conference communication terminal performs a data transmission via the B channels. More particularly, FIG. 9 shows a transmission sequence used when speech data, general-use data and moving picture data are transmitted between terminals via two B channels.

First, a calling terminal calls a destination terminal, and performs a call setup procedure via the D channel. Then, the calling terminal captures one B channel (hereinafter referred to as a first channel) (phase A). In order to establish the frame synchronization, frame data in which PCM speech data (A rule or μ rule, 64 kbps) is set is transmitted via the first channel (frame mode). When the frame synchronization is established, the capability BAS data and command BAS data are transmitted between the calling terminal and the called terminal (phase B1-1). A transmission mode used at this time is determined, and an additional call setup request for capturing the second B channel is started (phase B1-2).

From the contents mutually exchanged at that time, a transmission mode which is common to the both terminals and has the highest function is selected (phase B1-3). Then, the calling terminal issues the BAS command that specifies a receive function of the receive terminal such that the called terminal operates the receive function in the selected transmission mode. In this case, if the calling terminal receives the BAS command of the mode different from that of the BAS command sent by the calling terminal, the calling terminal resends the received BAS command so that the transmit mode is made to coincide with the receive mode. Then, the BAS command specifying the terminal function which causes the called terminal to operate the function is sent to the called terminal. In this way, parameters common to the calling terminal and the called terminals are selected (phase B2). Hence, in the first channel, data transmissions corresponding to the transmission mode selected at that time, such as a data transmission of speech data (16 kbps) and moving picture data (46.4 kbps) are carried out (phase C).

When the first channel starts the data transmission in the frame mode, the call setup procedure is carried out on the D channel with respect to the second B channel (hereinafter simply referred to as a second channel) (phase CA). When the second channel is established, the frame synchronization and the multiframe synchronization are established by transmitting and receiving, through the second channel, frame data only including the frame alignment signal FAS and the bit allocation signal BAS (phase CB1-11). Then, the synchronization between the first channel and the second channel is established (phase CB1-12).

When the synchronization as to the two B channels is completed, the calling terminal sends the BAS command to thereby set the transmission mode (phase CB1-2). The transmission mode is switched to the transmission mode set in the phase CB1-2, and the common parameters are set (phase CB2). If the BAS command different from the BAS command sent by the calling terminal is received, the received BAS command is sent again. Hence, the transmission mode is switched so that the transmit mode is switched to the receive mode, and the common parameters are set.

Figure 10:
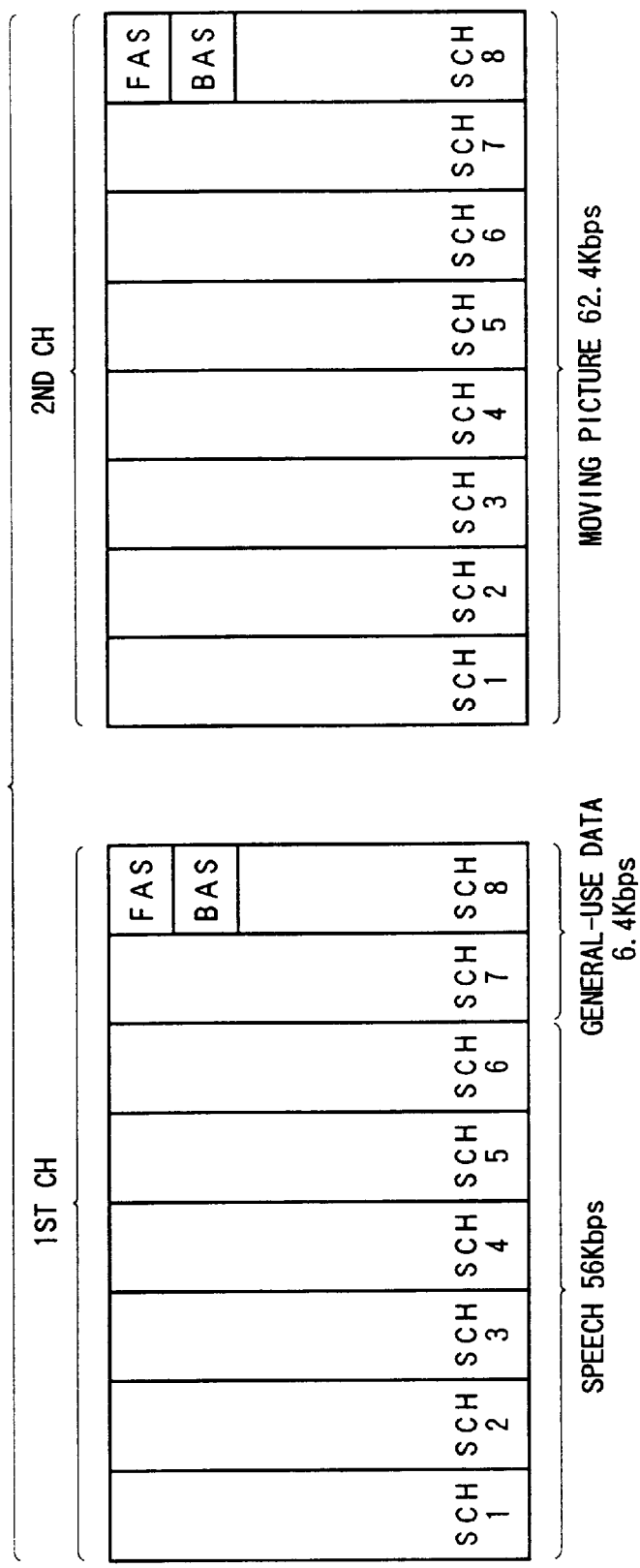
FIG. 10 is a diagram schematically illustrating transmission capacities allocated to speech data, general-use data and moving picture data in a data transmission using two B channels.

The initialization of the second channel is completed by the above-mentioned process, the data transmission is carried out through the two B channels in a state in which frame data transmitted through the first channel and the frame data transmitted through the second channel are synchronized with each other. For example, in the above data transmission, bit rates of 56 kbps, 6.4 kbps and 62.4 kbps are assigned to speech data, general-use data and moving picture data, respectively (see FIG. 10). The channel of the general-use data is used to transmit and receive data regarding the conference control function, the tele-writing communication function and bulk transfer function (group IV facsimile data and so on).

When the above data transmission is ended, the second channel is disconnected first. A procedure for setting the common mode is carried out for a transmission of speech data through the first channel only (phase CD1). In the second channel, the frame mode is switched to mode 0F (phase CD2). At this time, the first channel and the second channel are out of synchronization, and the call is maintained in the second channel only by the frame alignment signal FAS and the bit allocation signal BAS. In the above state, the call in the second channel can be released by a call disconnect/release procedure.

In the first channel, speech data is transmitted in the frame mode at a bit rate of 56 kbps between the phase CD1 and the phase CD2. The transmission of moving data is stopped. When the operator of one of the communicating terminals terminates speech, the mode is switched to mode 0F (phase D2). Thereafter, the call in the first channel can be released by a call disconnect/release procedure for the D channel.

Then, the call disconnect/release procedure is executed on the D channel with respect to the first and second channels (phase E), and the audio/visual transmission between the two terminals is terminated.

In the above way, in the audio/visual terminal such as the video conference communication terminal, one B channel (first channel) is established first to thereby establish the frame mode, and thereafter the bit rates are assigned to speech data and moving picture data, respectively. Hence, the data transmission is carried out in the transient mode, and the second channel is captured by the call setup procedure for the D channel if the setting of the second B channel (second channel) can be simultaneously carried out. Then, the first channel through which the data transmission is carried out in the transient mode and the second channel newly captured are made to be synchronized with each other. When the channel synchronization is established, the bit rates of speech data and moving picture data are assigned again. By utilizing an increased transmission capacity of the B channels, speech data and moving picture data of a higher quality can be transmitted.

When the data transmission is terminated, it is necessary to switch the transmission mode from the mode in which the transmission line in which the first and second channels are synchronized is used to the mode in which only the first channel is used. In order to follow the above way, the bit rate of 56 kbps of speech data is maintained while the transmission of moving picture data is stopped, so that the transmission mode is switched to the transmission mode using the first channel only. In the second channel, the synchronization with the first channel is released, and the transmission mode is switched to the mode OF in which use data is in a transmission-free state. The call is disconnected and released by the call disconnect/release procedure for the D channel. The first channel is switched to the mode OF, and thereafter the call is disconnected and released by the call disconnect/release procedure for the D channel. The accounting information obtained through the call disconnect/release procedure is managed for each channel.

Figure 11:
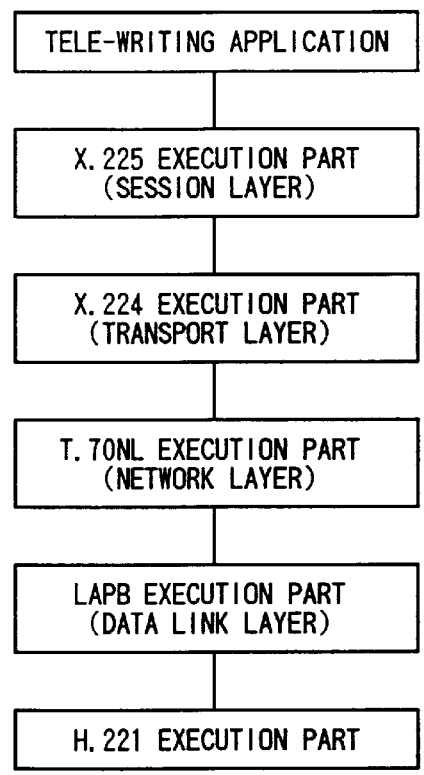
FIG. 11 is a diagram schematically showing a protocol execution part of a tele-writing application.

The tele-writing application is executed by a protocol having a hierarchal structure shown in FIG. 11.

When the terminal takes place the video conference communication with a remote terminal with the above structure, the above-mentioned pre-transmission procedures are carried out so that the communication functions and capabilities are exchanged. Thereafter, a data transmission is carried out by using information channels.

After a connection for use in the tele-writing communication is established, information indicating the capabilities regarding the above tele-writing is exchanged by using the above connection. One of the capabilities relates to the number of display pixels (the two dimensions) provided for a tele-writing application.

If the number of display pixels of the terminal being considered is larger than that of the remote terminal, the number of pixels of the remote terminal is set to the common number of pixels effective in the video conference communication session carried out at that time.

Figure 12:
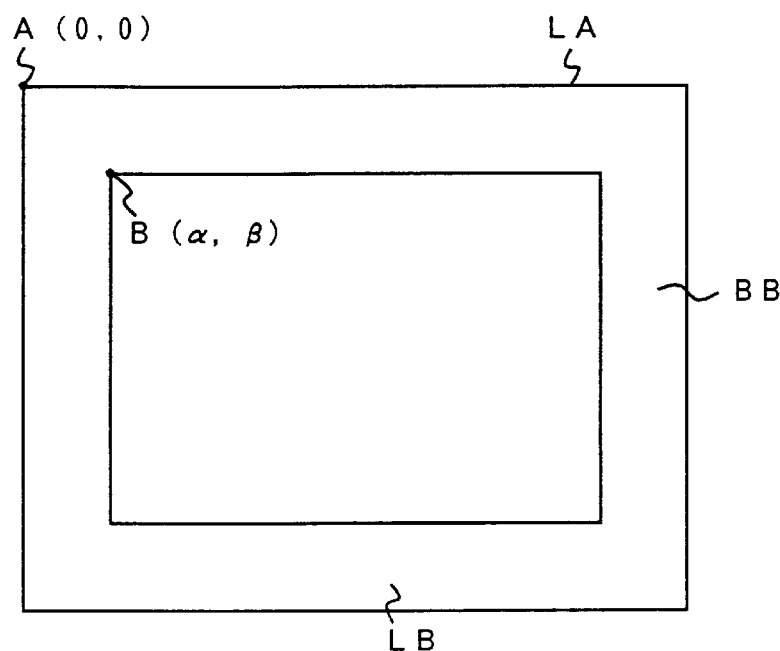
FIG. 12 is a view schematically showing a handwritten input display area in the tele-writing application.

Then, as shown in FIG. 12, a display area LB consisting of the number of pixels common to both the terminals is set in the central portion of the display screen LA of the focusing terminal. In the display screen LA, a given background display (for example, totally white or black) is made in an area BB other than the display area LB.

In this case, a reference point of the display area LB is expressed as ($\alpha$, $\beta$) of the coordinates having the origin of the reference point A of the display area LA. When data received from the remote terminal is displayed, $\alpha$ and $\beta$ are respectively added to the values of the X and Y coordinates contained in the received data, so that the received data can be made to match the display coordinates of the display screen LA of the focusing terminal.

When data is sent from the focusing terminal to the remote terminal, $\alpha$ and $\beta$ are respectively subtracted from the values of the X and Y coordinates, so that the coordinates of transmitted data are changed.

If the number of pixels of the focusing terminal is smaller than that of the remote terminal, the display screen of the focusing terminal can be directly used. Hence, the above-mentioned coordinates conversion process is not needed.

Figure 13:
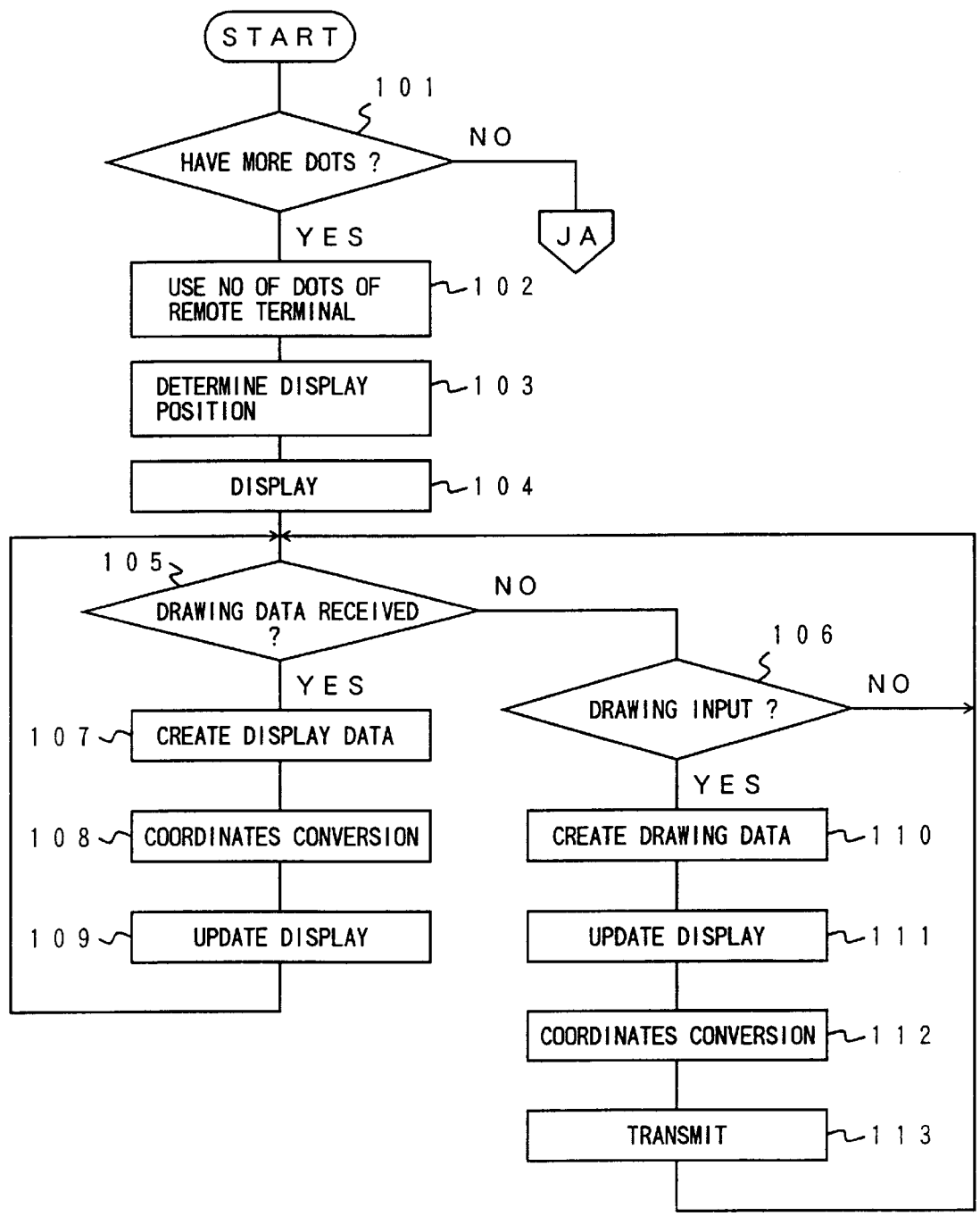
FIG. 13 is a flowchart of part of an example of a display process.
Figure 14:
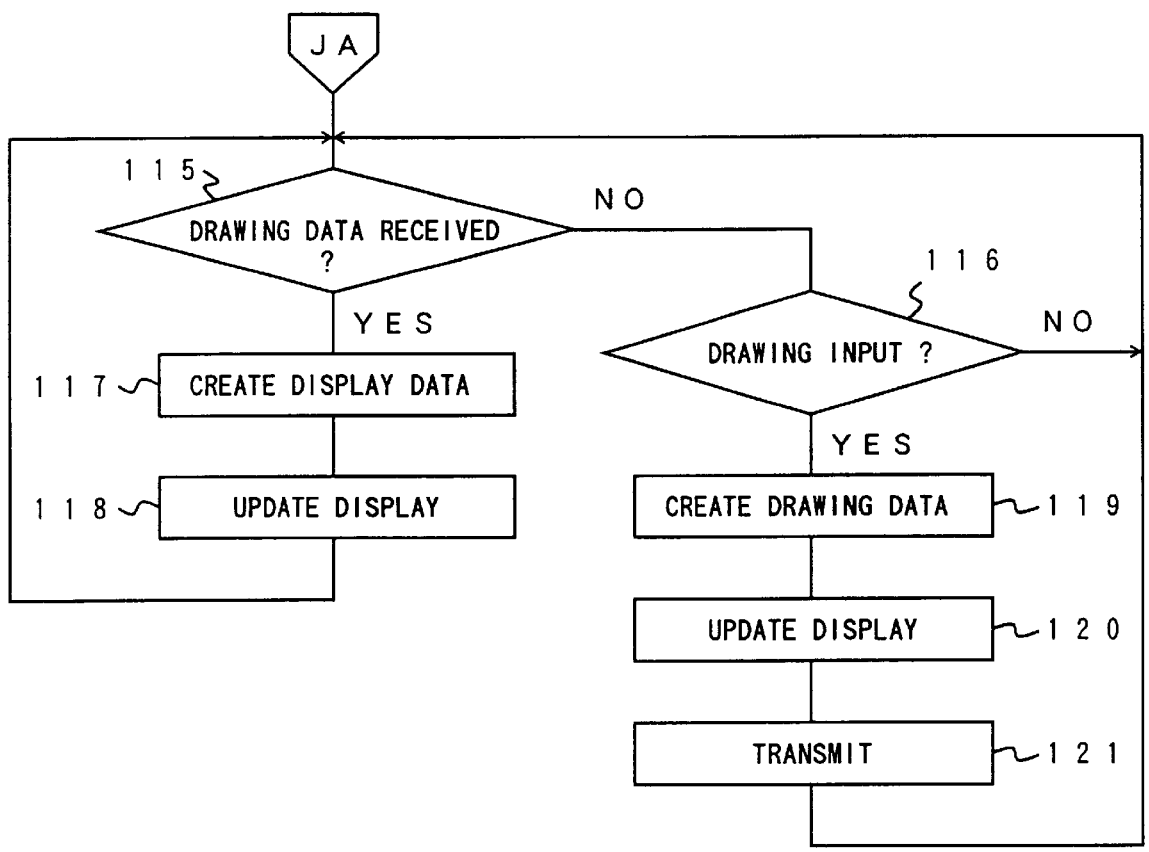
FIG. 14 is a flowchart of the other part of the display process related to FIG. 13.

FIGS. 13 and 14 show an example of the process to be executed when the number of pixels of the focusing terminal is smaller than that of the remote terminal.

First, it is determined of the number of pixels (dots) of the focusing terminal is larger than that of the remote terminal (step 101). If the result of the step 101 determination is YES, the number of pixels of the remote terminal is set to the common effective number of pixels (step 102). The display area consisting of the common number of pixels set in step 102 is defined in the display screen of the focusing terminal (step 103).

The display area thus formed is displayed (step 104), and the focusing terminal is maintained in the standby state until drawing data is received from the remote terminal or the user of the focusing terminal inputs a drawing (a NO loop of steps 105 and 106).

When drawing data is received from the remote terminal and the result of step 105 is YES, display data for displaying the received drawing data is created (step 107), and the coordinates are converted in the aforementioned way (step 108). The display image obtained after converting the coordinates is displayed on the display screen. In this way, the display is updated (step 109) and the process returns to step 105.

If the user of the focusing terminal performs drawing input and the result of step 106 is YES, drawing data corresponding to the content of the drawing is created (step 110), and the display content is updated based on the created drawing data (step 111). The coordinates of the drawing data to be transmitted are converted in the aforementioned way (step 112), and the drawing data obtained after converting the coordinates is transmitted to the remote terminal (step 113). Then, the process returns to step 105.

If the result of step 101 is NO, the focusing terminal is maintained in the standby mode until the drawing data is received from the remote terminal or the user of the focusing terminal inputs a drawing (a NO loop of steps 115 and 116).

If the drawing data is received from the remote terminal and the result of step 115 is YES, display data for displaying the received drawing data is created (step 117), and the display image formed by the display data is displayed on the display screen so that the displayed content is updated (step 118). Then the process returns to step 115.

If the user of the focusing terminal performs drawing input and the result of step 116 is YES, drawing data corresponding to the content of the drawing is created (step 119), and the display content is updated based on the created drawing data (step 120). Then, the created drawing data is sent to the remote terminal (step 121), and the process returns to step 115.

In the above-mentioned embodiment of the present invention, a terminal having a larger number of pixels cannot efficiently use the display screen of the liquid crystal display unit 10 of the above terminal. However, in such a terminal, it is possible to utilize the display screen of the liquid crystal display unit 10 by enlarging the display content of the drawing data received from the remote terminal. In this case, the coordinates of the drawing data input by using the touch panel unit 12 of the terminal are reduced so that the coordinates can be handled by the number of pixels of the remote terminal. Then, drawing data described in the reduced coordinates is sent to the remote terminal.

Figure 15A:
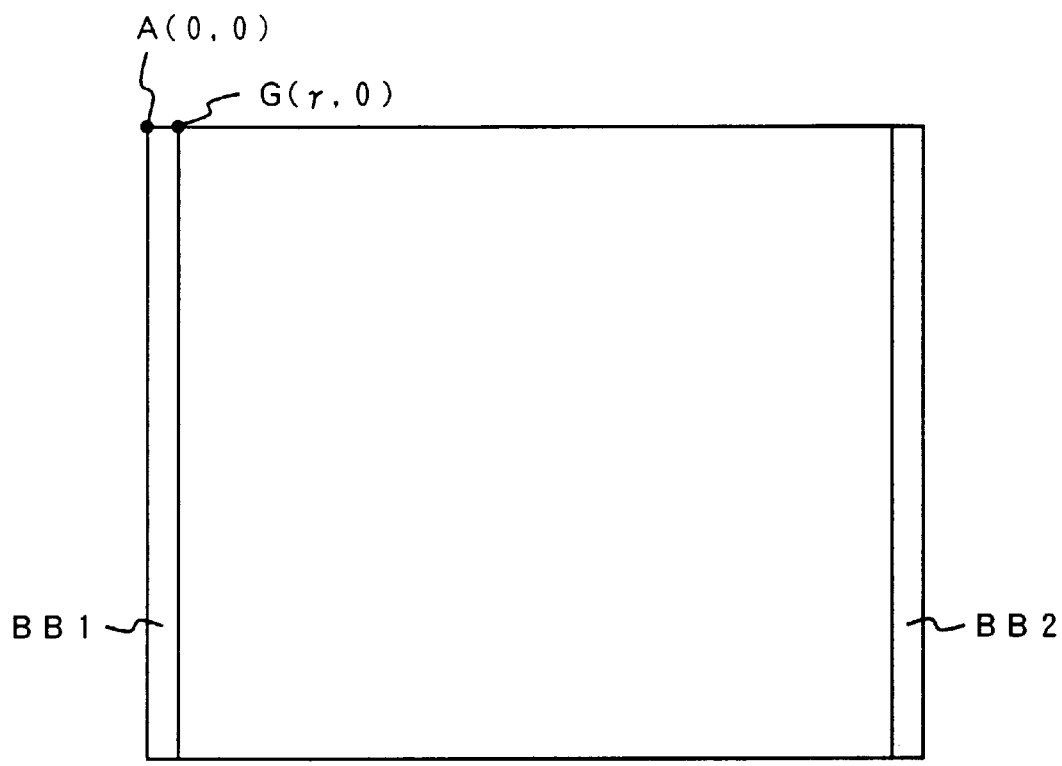
FIGS. 15A and 15B are views schematically showing an example of a case where a handwritten input display area is defined based on a terminal having a smaller number of pixels.
Figure 15B:
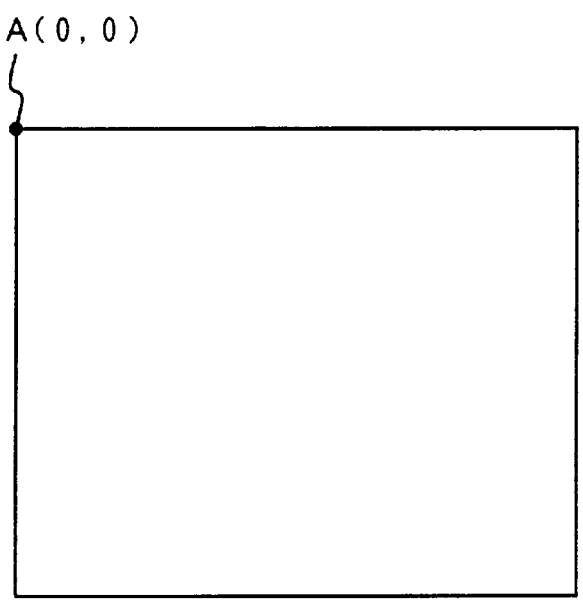

For example, in a case where the display screen of the focusing terminal has a number of pixels shown in FIG. 15A, and the display screen of the remote terminal has a number of pixels shown in FIG. 15B, an enlarged version of the display screen of the remote terminal is displayed on the display screen of the focusing terminal. In this case, the coordinates of the origin A of the original display screen of the focusing terminal are (0, 0), while the coordinates of the origin G of the effective display area to be enlarged are (τ, 0).

The magnification ratio of the effective display area to be enlarged is the smaller of a ratio in the transverse direction and a ratio in the longitudinal direction. The ratio in the transverse direction is equal to (the number of pixels in the transverse direction of the focusing terminal)/(the number of pixels in the transverse direction of the remote terminal). The ratio in the longitudinal direction is equal to (the number of pixels in the longitudinal direction of the focusing terminal)/(the number of pixels in the longitudinal direction in the remote terminal). When the smaller one is selected, the ratio in the longitudinal direction is small, so that the magnifications in the transverse and longitudinal directions are set to the ratio in the longitudinal direction. Areas BB1 and BB2 are formed on right and left sides of the effective display area. These areas BB1 and BB2 are displayed with a given background color.

The procedure for converting the coordinates in the above case is as follows. The coordinates of the received drawing data are multiplied by the ratio in the longitudinal direction so that the coordinates system is enlarged. Then, τ and 0 are respectively added to the values of the enlarged coordinates in the X and Y directions. When input drawing data is transmitted, τ and 0 are respectively subtracted from the values of the coordinates in the X and Y directions, and the resultant coordinates values are multiplied by the inverse number of the ratio in the longitudinal direction so that the coordinates system is reduced.

Figure 16:
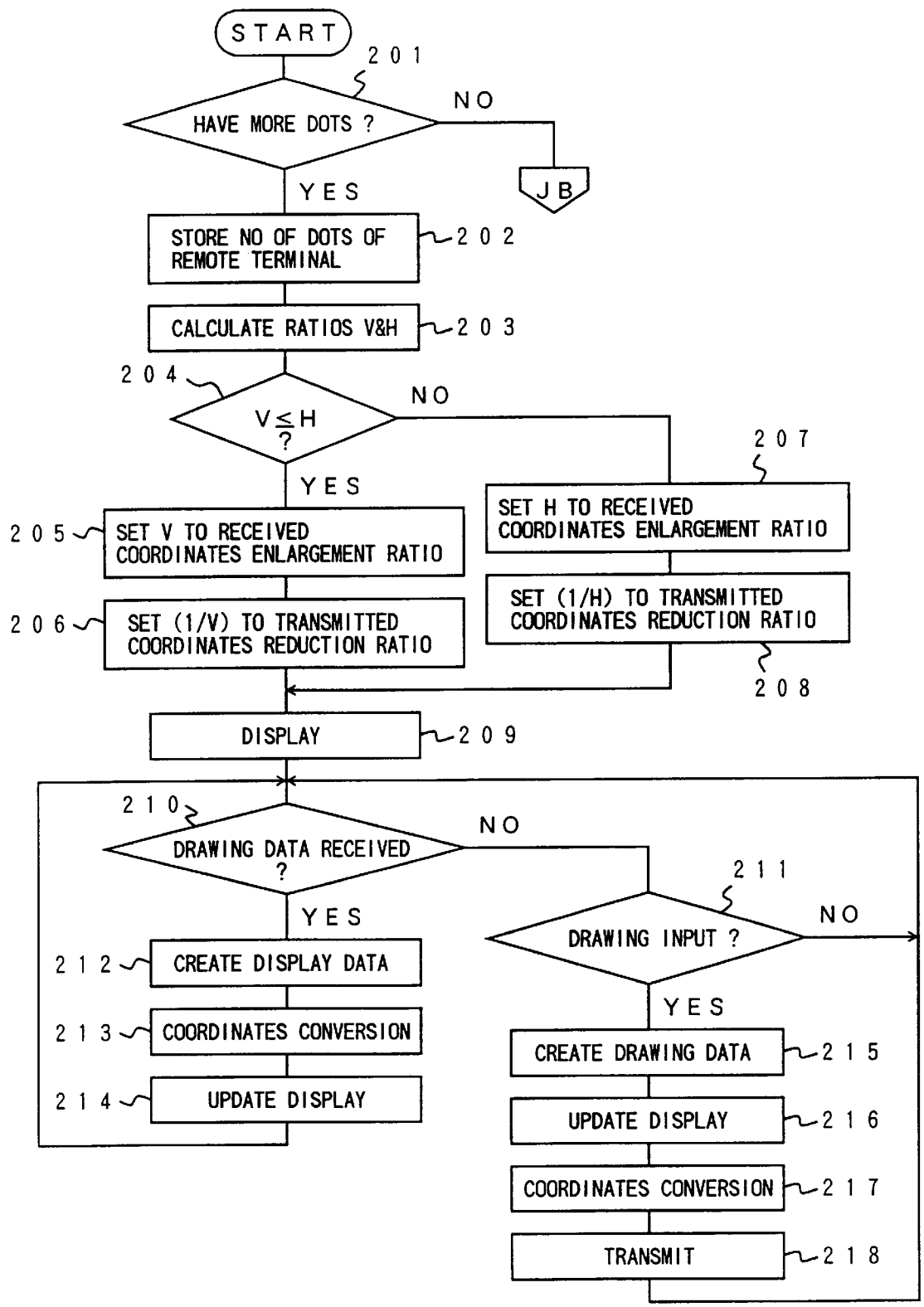
FIG. 16 is a flowchart of part of another example of the display process.
Figure 17:
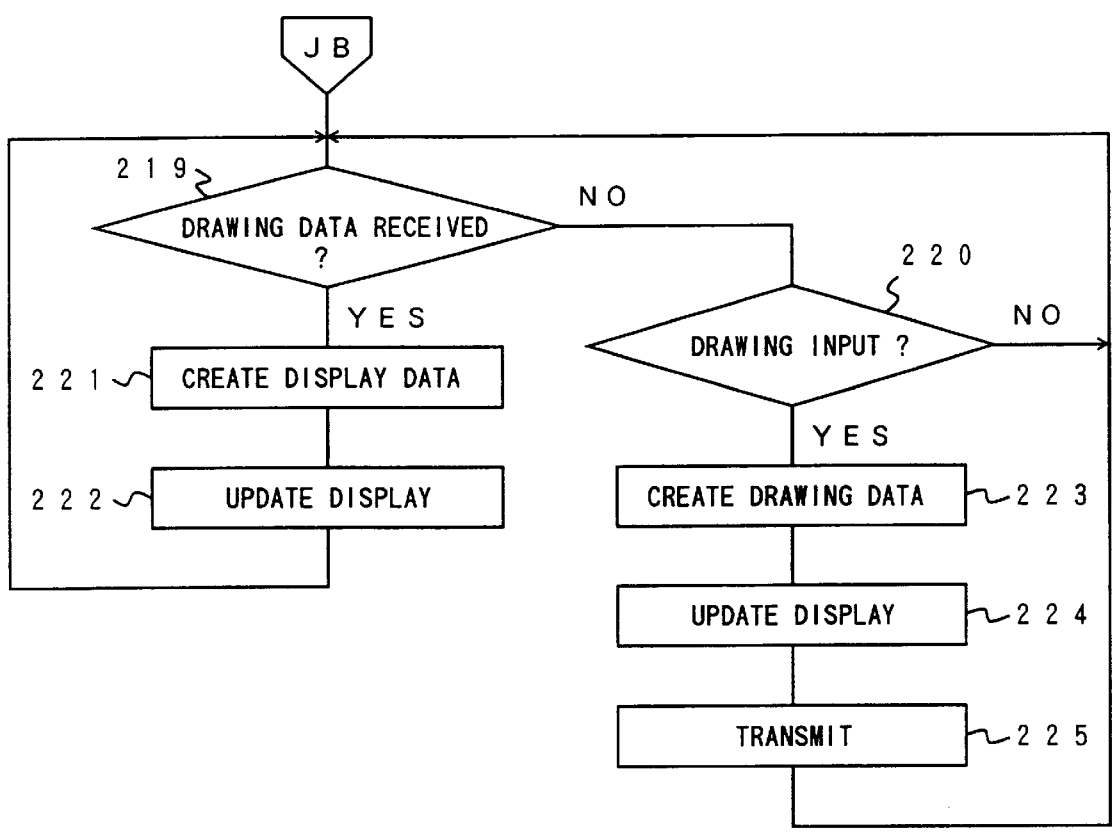
FIG. 17 is a flowchart of the other part of the display process related to FIG. 16.

An example of the display process executed in the above case is shown in FIGS. 16 and 17.

First it is determined whether the number of pixels (dots) of the focusing terminal is larger than that of the remote terminal (step 201). If the result of step 201 is YES, the number of pixels of the remote terminal is stored (step 202). Then, the longitudinal-direction ratio V and the transverse-direction ratio H regarding the numbers of pixels of the focusing and remote terminals are calculated (step 203).

It is then determined whether the longitudinal-direction ratio V is equal to or less than the transverse-direction ratio H (step 204). If the result of step 204 is YES, the value of the longitudinal-direction ratio V is set in the received coordinates enlargement ratio (step 205). Further, the inverse number of the longitudinal-direction ratio V is set in the transmitted coordinates reduction ratio (step 206).

If the result of step 204 is NO, the value of the transverse-direction ratio H is set in the received coordinates enlargement ratio (step 207). Further, the inverse number of the transverse-direction ratio H is set in the transmitted coordinates reduction ratio (step 208).

When the received coordinates enlargement ratio and the transmitted coordinates reduction ratio are set in the above manner, the common display area is displayed in the center (step 209). Then, the focusing terminal is maintained in the standby state until drawing data is received from the remote terminal or the user of the focusing terminal inputs a drawing (a NO loop of steps 210 and 211).

If drawing data is received from the remote terminal and the result of step 210 is YES, display data for displaying the received drawing data is created (step 212). The display image formed by the display data is subjected to the above-mentioned coordinates converting process (step 213). The display image obtained after converting the coordinates is displayed on the display screen so that the display is updated (step 214). Then, the process returns to step 210.

If the user of the focusing terminal inputs a drawing and the result of step 211 is YES, drawing data corresponding to the content of the input drawing is created (step 215), and the display content is updated in accordance with the drawing content (step 216). The coordinates of the created drawing data are subjected to the aforementioned coordinates conversion process (step 217). The drawing data obtained after the coordinates conversion is transmitted to the remote terminal (step 218). Then the process returns to step 210.

If the result of step 201 is NO, the focusing terminal is maintained in the standby state until drawing data is received from the remote terminal or the user of the focusing terminal inputs a drawing (a NO loop of steps 219 and 220).

If the drawing data is received from the remote terminal and the result of step 219 is YES, display data for displaying the received drawing data is created (step 221), and a display image formed by the display data is displayed on the display screen so that the display is updated (step 222). Then, the process returns to step 219.

If the user of the focusing terminal inputs a drawing and the result of step 220 is YES, drawing data corresponding to the drawing content is created (step 223) and the display content is updated according to the drawing content (step 224). Then, the created drawing data is sent to the remote terminal (step 225), and the process returns to step 219.

In the above-mentioned embodiment of the present invention, the coordinates conversion process for the received data and transmitted data is carried out at the terminal having a larger number of display pixels. Alternatively, it is possible to perform the coordinates conversion process for the received data and transmitted data at the other terminal having a smaller number of display pixels.

In this case, when drawing data received from the remote terminal is displayed at the other terminal having a smaller number of pixels, the display content is reduced in size and the coordinates of the drawing data input by using the touch panel unit 12 of the focusing terminal (having a smaller number of pixels) are subjected to the coordinates conversion process directed to enlarging the coordinates. Then, the drawing data described by the enlarged coordinates is sent to the remote terminal.

Figure 18A:
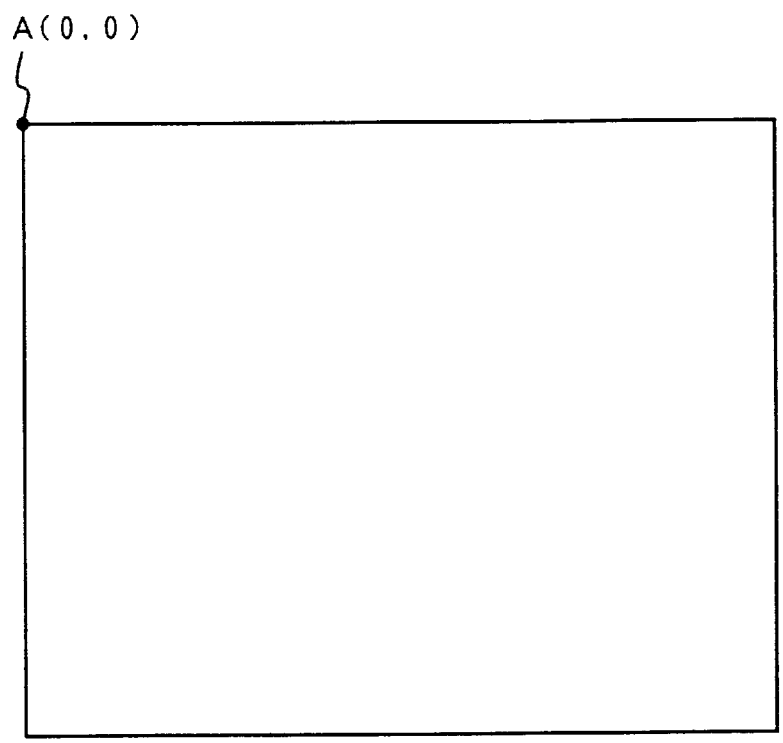
FIGS. 18A and 18B are views schematically showing an example of a case where the handwritten input display area is defined based on a terminal having a larger number of pixels.
Figure 18B:
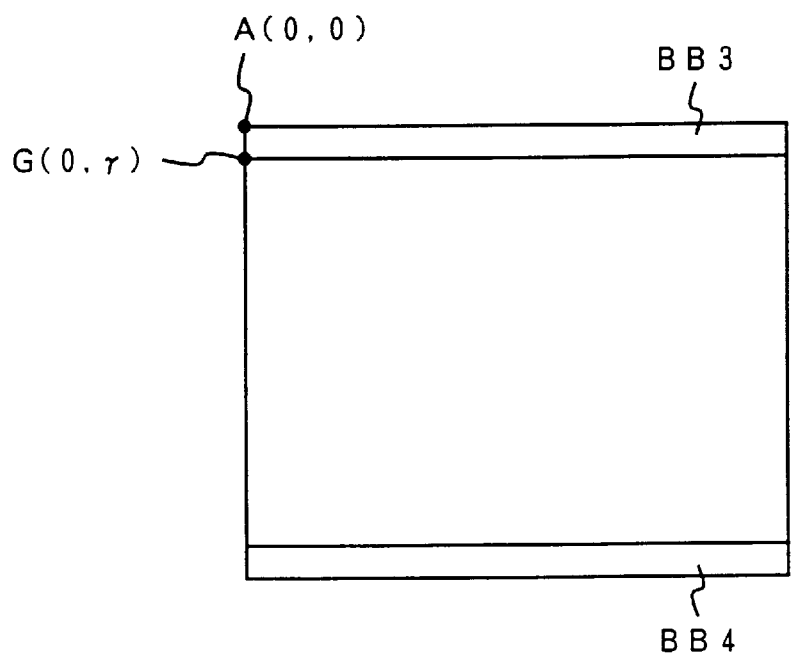

For example, if the display screen of the focusing terminal has a number of pixels shown in FIG. 18B and the display screen of the remote terminal has a number of pixels shown in FIG. 18A, a reduced version of the display screen of the remote terminal is displayed on the display screen of the focusing terminal. In this case, the coordinates of the origin A of the original display screen of the focusing terminal are (0, 0), while the coordinates of the origin G of the effective display area which is displayed in a reduced size are (0, τ).

The magnification ratio of the effective display area to be reduced is the smaller of the ratio in the transverse direction and the ratio in the longitudinal direction. As has been described previously, the ratio in the transverse direction (sometimes referred to as a transverse-direction ratio) is equal to (the number of pixels in the transverse direction of the focusing terminal)/(the number of pixels in the transverse direction of the remote terminal). The ratio in the longitudinal direction (sometimes referred to as a longitudinal-direction ratio) is equal to (the number of pixels in the longitudinal direction of the focusing terminal)/(the number of pixels in the longitudinal direction in the remote terminal). When the smaller one is selected, the ratio in the transverse direction is small, so that the magnifications in the transverse and longitudinal directions are set to the ratio in the transverse direction. Areas BB3 and BB4 are formed on above and below sides of the effective display area. These areas BB3 and BB4 are displayed with a given background color.

The procedure for converting the coordinates in the above case is as follows. The coordinates of the received drawing data are multiplied by the ratio in the transverse direction so that the coordinates system is reduced. Then, 0 and τ are respectively added to the values of the reduced coordinates in the X and Y directions. When input drawing data is transmitted, 0 and τ are respectively subtracted from the values of the coordinates in the X and Y directions, and the resultant coordinates values are multiplied by the inverse number of the ratio in the transverse direction so that the coordinates system is enlarged.

Figure 19:
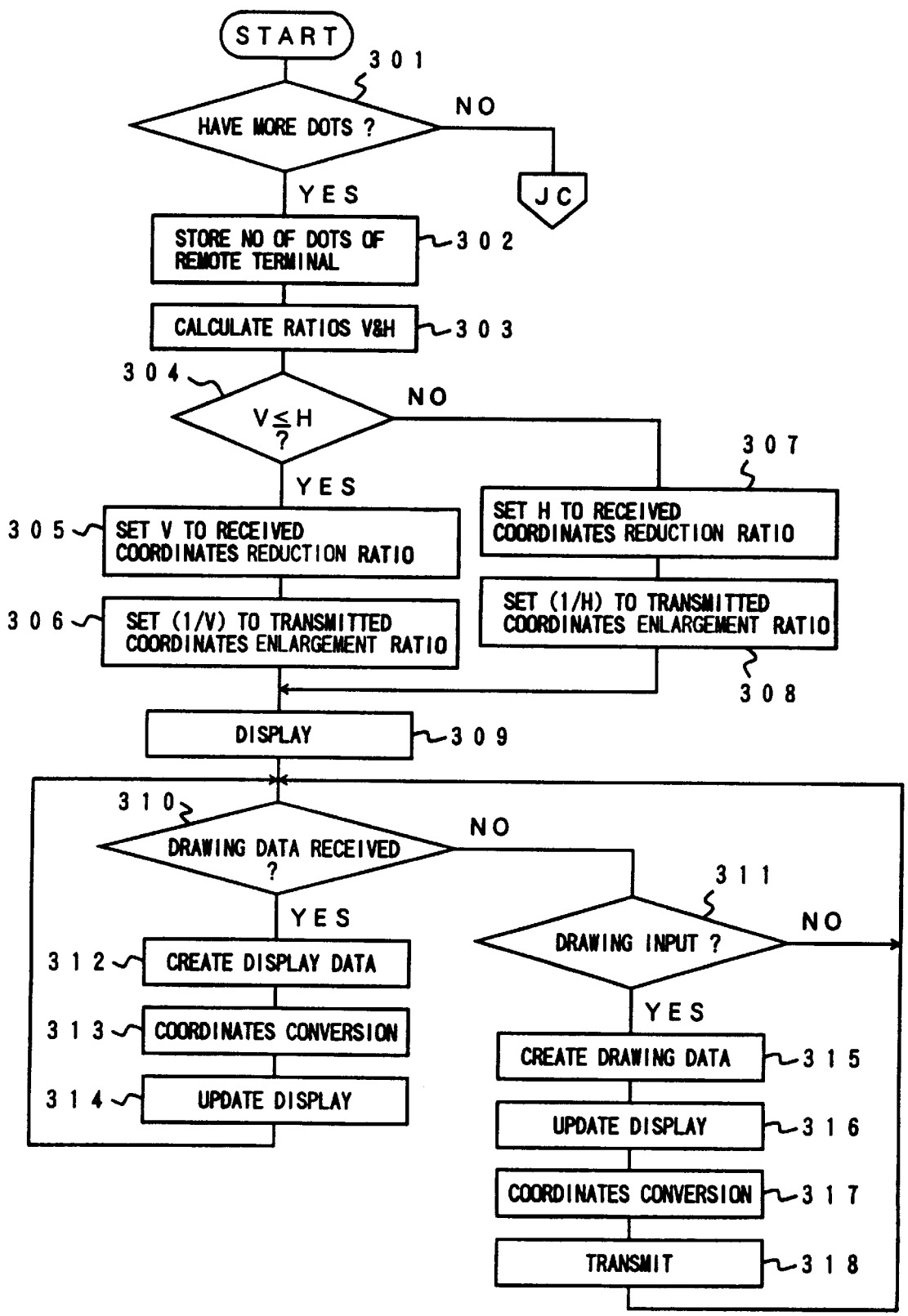
FIG. 19 is a flowchart of part of yet another example of the display process.
Figure 20:
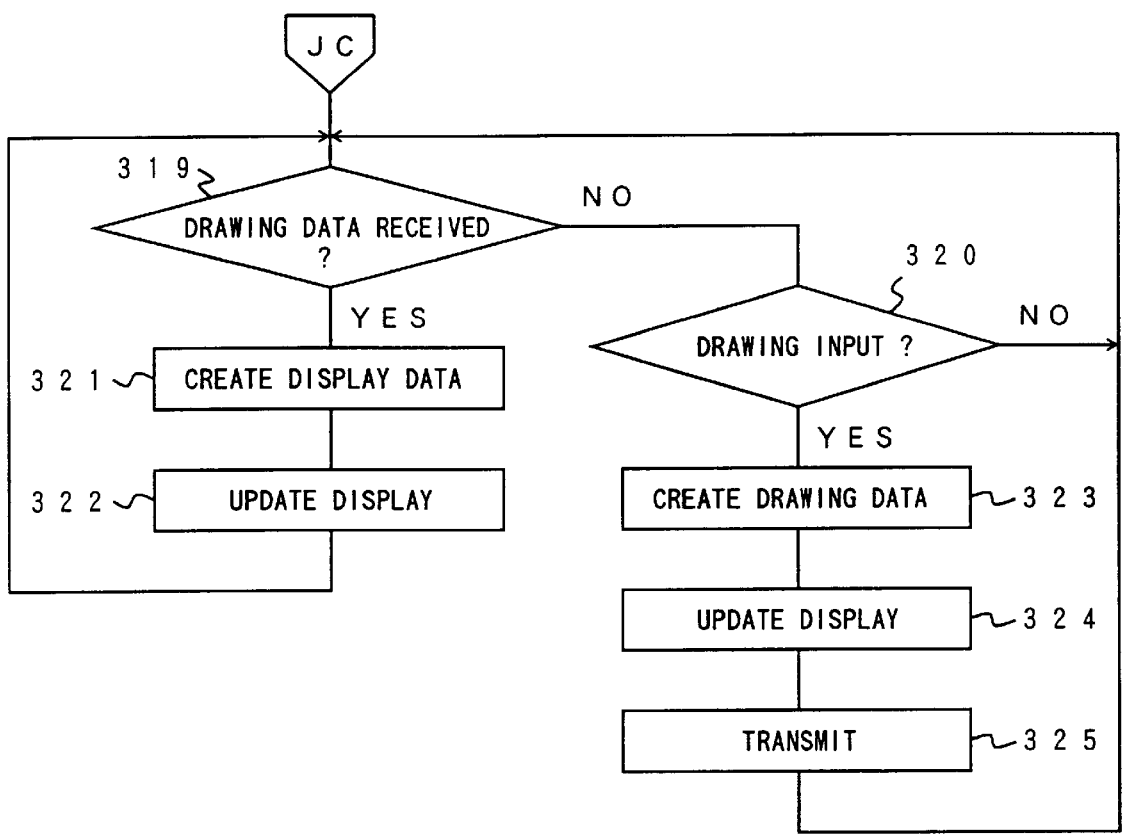
FIG. 20 is a flowchart of the other part of the display process related to FIG. 19.

An example of the display process executed in the above case is shown in FIGS. 19 and 20.

First, it is determined whether the number of pixels (dots) of the focusing terminal is smaller than that of the remote terminal (step 301). If the result of step 301 is YES, the number of pixels of the remote terminal is stored (step 302). Then, the longitudinal-direction ratio V and the transverse-direction ratio H regarding the numbers of pixels of the focusing and remote terminals are calculated (step 303).

It is then determined whether the longitudinal-direction ratio V is equal to or less than the transverse-direction ratio H (step 304). If the result of step 304 is YES, the value of the longitudinal-direction ratio V is set in the received coordinates reduction ratio (step 305). Further, the inverse number of the longitudinal-direction ratio V is set in the transmitted coordinates enlargement ratio (step 306).

If the result of step 304 is NO, the value of the transverse-direction ratio H is set in the received coordinates reduction ratio (step 307). Further, the inverse number of the transverse-direction ratio H is set in the transmitted coordinates enlargement ratio (step 308).

When the received coordinates reduction ratio and the transmitted coordinates enlargement ratio are set in the above manner, the common display area is displayed in the center (step 309). Then, the focusing terminal is maintained in the standby state until drawing data is received from the remote terminal or the user of the focusing terminal inputs a drawing (a NO loop of steps 310 and 311).

If drawing data is received from the remote terminal and the result of step 310 is YES, display data for displaying the received drawing data is created (step 312). The display image formed by the display data is subjected to the above-mentioned coordinates converting process (step 313). The display image obtained after converting the coordinates is displayed on the display screen so that the display is updated (step 314). Then, the process returns to step 310.

If the user of the focusing terminal inputs a drawing and the result of step 311 is YES, drawing data corresponding to the content of the input drawing is created (step 315), and the display content is updated in accordance with the drawing content (step 316). The coordinates of the created drawing data are subjected to the aforementioned coordinates conversion process (step 317). The drawing data obtained after the coordinates conversion is transmitted to the remote terminal (step 318). Then the process returns to step 310.

If the result of step 301 is NO, the focusing terminal is maintained in the standby state until drawing data is received from the remote terminal or the user of the focusing terminal inputs a drawing (a NO loop of steps 319 and 320).

If the drawing data is received from the remote terminal and the result of step 319 is YES, display data for displaying the received drawing data is created (step 321), and a display image formed by the display data is displayed on the display screen so that the display is updated (step 322). Then, the process returns to step 319.

If the user of the focusing terminal inputs a drawing and the result of step 320 is YES, drawing data corresponding to the drawing content is created (step 323) and the display content is updated according to the drawing content (step 324). Then, the created drawing data is sent to the remote terminal (step 325), and the process returns to step 319.

In the above-mentioned embodiment of the present invention, the ratios in the longitudinal and transverse directions regarding the transmit and receive data are the same as each other. Alternatively, it is possible to respectively set the ratios in the longitudinal and transverse directions equal to the ratios of the numbers of pixels of the focusing terminal and the remote terminal.

In the above-mentioned embodiment of the present invention, the number of pixels of the focusing terminal and the number of pixels of the remote terminal are compared with each other every communication. In this case, either the number of pixels of the focusing terminal or the number of pixels of the remote terminal is selected in order to perform the setting of the display area common to the communicating terminals. Alternatively, it is possible to set a particular display area common to the terminals, the particularly display area having a predetermined number of pixels. In this case, a display of handwritten inputs is allowed to take place on the particular display area.

Figure 21A:
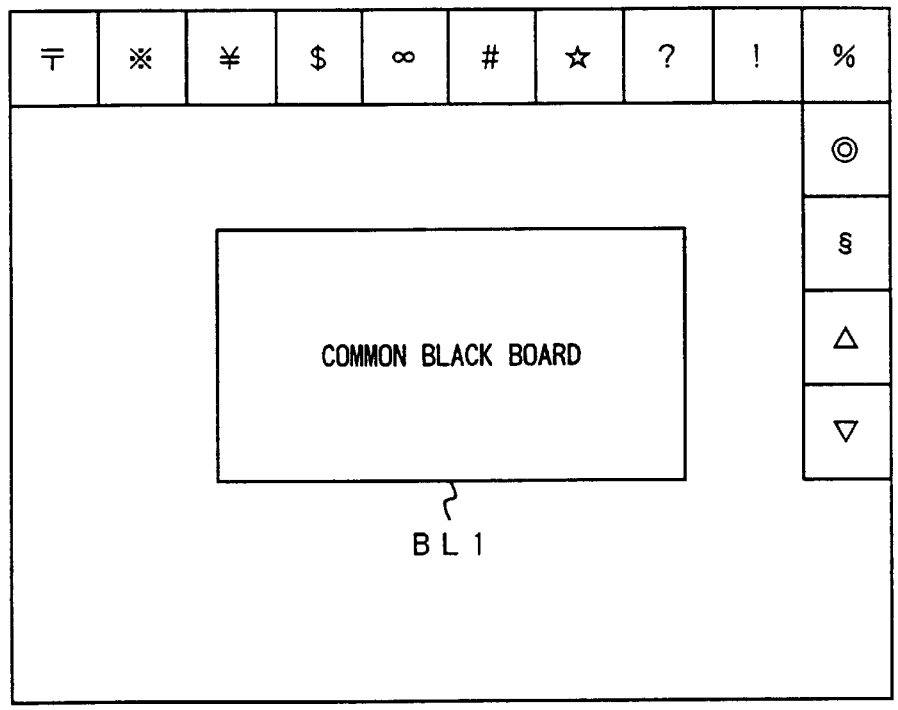
FIGS. 21A and 21B are views schematically showing an example of a case where a common black board is defined and used as a handwritten input display area.
Figure 21B:
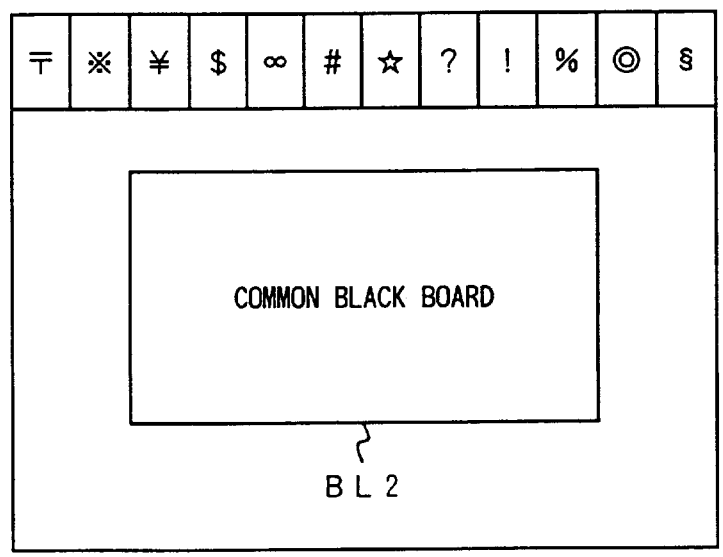

For example, as shown in FIGS. 21A and 21B, common black boards BL1 and BL2 are defined. Display screens of the common black boards BL1 and BL2 are displayed on the coordinates area (for example, the central portion) of the display screens. A display of handwritten inputs is limited to the inner areas of the common black boards BL1 and BL2. In this way, it is possible to display handwritten inputs at the respective terminals under the identical conditions.

The area other than the common black board BL1 and BL2 can be used to display arbitrary indication elements. In the cases of FIGS. 21A and 21B, the tele-writing application displays a large number of operation symbols around the common black boards BL1 and BL2. In FIG. 21A, the operation symbols are relatively large because the display screen is relatively wide. In FIG. 21B, the operation symbols are relatively small because the display screen is relatively narrow.

A display process executed in the above case is shown in FIG. 22.

First, the common black board having a predetermined number of pixels is defined in accordance with the number of pixels of the focusing terminal and the number of pixels of the remote terminal (step 401). Then, the display screen including the common black board is displayed (step 402).

Then, the focusing terminal is maintained in the standby state until drawing data is received from the remote terminal or the user of the focusing terminal inputs a drawing (a NO loop of steps 403 and 404).

If drawing data is received from the remote terminal and the result of step 403 is YES, display data for displaying the received drawing data is created (step 405). Then, the display image formed by the display data is displayed on the common black board so that the display is updated (step 406). Then, the process returns to step 403.

If the user of the focusing terminal inputs a drawing and the result of step 404 is YES, it is discerned whether the drawing range used at that time is included in the common black board (step 407). If the result of step 407 is YES, drawing data corresponding to the content of the drawing is created (step 408), and the display content is updated in accordance with the drawing content (step 409). Then, the created drawing data is transmitted to the remote terminal (step 410), and the process returns to step 403.

If the result of step 407 is NO, a process corresponding to the operation performed at that time (if the operation relates to a process for specifying an operation symbol, a symbol determination process and a process corresponding to the operation symbol) is performed (step 411). Then, the process returns to step 403.

In the above-mentioned embodiment of the present invention, the present invention is applied to the video conference communication terminal. However, the present invention includes communication terminal equipped with any handwritten input display unit.

According to the present invention, the number of pixels of one terminal is made to coincide with the number of pixels of the other terminal, so that an appropriate handwritten input can be displayed.

According to the present invention, the common display area used to display handwritten input is defined based on the smaller of the numbers of pixels of the focusing and remote terminals. If the number of pixels of the focusing terminal is larger than the number of pixels forming the common display area, the coordinates of the received handwritten input signal are enlarged, and the coordinates of the handwritten input signal to be transmitted are reduced. Hence, it is possible to perform appropriate handwritten input display and efficiently utilize the original display screens of the respective terminals.

According to the present invention, the common display area used to display handwritten input is defined based on the larger of the numbers of pixels of the focusing and remote terminals. If the number of pixels of the focusing terminal is smaller than the number of pixels forming the common display area, the coordinates of the received handwritten input signal are reduced, and the coordinates of the handwritten input signal to be transmitted are enlarged. Hence, it is possible to perform appropriate handwritten input display and efficiently utilize the original display screens of the respective terminals.

According to the present invention, the common display area having the given number of pixels is defined between the terminals communicating with each other, and a display of handwritten input is made on the common display area. Hence, it is possible to perform appropriate handwritten input display and efficiently utilize areas other than the common display area, which leads to an improvement in use of resources.

The present invention is not limited to specifically disclosed embodiment and its variations, and other variations and modifications can be made without departing from the scope of the present invention.

What is claimed is:

1. A communication conference method which uses display units in order to display handwritten inputs, wherein handwritten input signals are transmitted between first and second terminals to perform a communication conference session, said communication conference method comprising the steps of:

exchanging information through a communication line concerning numbers of pixels of the display units between the first and second terminals;

determining coordinates of display data corresponding to the handwritten input signals transmitted between the first and second terminals based on the exchanged information of the number of pixels of the display units exchanged between the first and second terminals; and setting a common display area used in said communication conference session, said common display area having the smaller of the number of pixels of the first terminal and the number of pixels of the second terminal.

2. A communication conference method which uses display units in order to display handwritten inputs, wherein handwritten input signals are transmitted between first and second terminals to perform a communication conference session, said communication conference method comprising the steps of:

exchanging information concerning numbers of pixels of the display units between the first and second terminals;

setting a common display area used in said communication conference session, said common display area having the smaller of the number of pixels of the first terminal and the number of pixels of the second terminal;

enlarging, at the first terminal when the number of pixels of the display unit of the first terminal is larger than the number of pixels of the common display area, coordinates of the handwritten input signal received from the second terminal at a ratio of the number of pixels of the common display area and the number of pixels of the display unit of the first terminal; and reducing coordinates of the handwritten input signal to be transmitted to the second terminal from the first terminal at an inverse number of said ratio.

3. A communication conference method which uses display units in order to display handwritten inputs, wherein handwritten input signals are transmitted between first and second terminals to perform a communication conference session, said communication conference method comprising the steps of:

exchanging information concerning numbers of pixels of the display units between the first and second terminals;

setting a common display area used in said communication conference session, said common display area having the larger of the number of pixels of the first terminal and the number of pixels of the second terminal;

reducing, at the first terminal when the number of pixels of the display unit of the first terminal is smaller than the number of pixels of the common display area, coordinates of the handwritten input signal received from the second terminal at a ratio of the number of pixels of the common display area and the number of pixels of the display unit of the first terminal; and enlarging coordinates of the handwritten input signal to be transmitted to the second terminal from the first terminal at an inverse number of said ratio.

4. A communication conference method which uses display units in order to display handwritten inputs, wherein handwritten input signals are transmitted between first and second terminals to perform a communication conference session, said communication conference method comprising the steps of:

exchanging information through a communication line concerning numbers of pixels of the display between the first and second terminals;

setting, at the first and second terminals, a common display area having a predetermined number of pixels;

determining coordinates of display data corresponding to the handwritten input signals transmitted between the first and second terminals through a communication between the first and second terminals through the communication line; and performing a display of the display data on common display areas of the display units of the first and second terminals based on the determined coordinates.

5. A communication conference terminal which uses a display unit in order to display handwritten inputs, wherein handwritten input signals are transmitted between the communication conference terminal and a remote terminal to perform a communication conference session, said communication conference terminal comprising:

first means for exchanging information through a communication line concerning numbers of pixels of the display units between the communication conference terminal and the remote terminal;

determining means for determining coordinates of display data corresponding to the handwritten input signals transmitted between the communication conference terminal and the remote terminal based on the exchanged information of the number of pixels of the display units exchanged between the communication conference terminal and the remote terminal; and second means for setting a common display area used in said communication conference session, said common display area having the smaller of the number of pixels of the communication conference terminal and the number of pixels of the remote terminal.

6. A communication conference terminal which uses a display unit in order to display handwritten inputs, wherein handwritten input signals are transmitted between the communication conference terminal and a remote terminal to perform a communication conference session, said communication conference terminal comprising:

first means for exchanging information concerning numbers of pixels of the display units between the communication conference terminal and the remote terminal;

second means for setting a common display area used in said communication conference session, said common display area having the smaller of the number of pixels of the communication conference terminal and the number of pixels of the remote terminal;

third means for enlarging, at the communication conference terminal when the number of pixels of the display unit of the communication conference terminal is larger than the number of pixels of the common display area, coordinates of the handwritten input signal received from the remote terminal at a ratio of the number of pixels of the common display area and the number of pixels of the display unit of the communication conference terminal; and fourth means for reducing coordinates of the handwritten input signal to be transmitted to the remote terminal from the communication conference terminal at an inverse number of said ratio.

7. A communication conference terminal which uses a display unit in order to display handwritten inputs, wherein handwritten input signals are transmitted between the communication conference terminal and a remote terminal to perform a communication conference session, said communication conference terminal comprising:

first means for exchanging information concerning numbers of pixels of the display units between the communication conference terminal and the remote terminal;

second means for setting a common display area used in said communication conference session, said common display area having the larger of the number of pixels of the communication conference terminal and the number of pixels of the remote terminal;

third means for reducing, at the communication conference terminal when the number of pixels of the display unit of the communication conference terminal is smaller than the number of pixels of the common display area, coordinates of the handwritten input signal received from the remote terminal at a ratio of the number of pixels of the common display area and the number of pixels of the display unit of the communication conference terminal; and fourth means for enlarging coordinates of the handwritten input signal to be transmitted to the remote terminal from the communication conference terminal at an inverse number of said ratio.

8. A communication conference terminal which uses a display unit in order to display handwritten inputs, wherein handwritten input signals are transmitted between the communication conference terminal and a remote terminal to perform a communication conference session, said communication conference terminal comprising:

first means for exchanging information through a communication line concerning numbers of pixels of the display units between the first and second terminals;

second means for setting a common display area having a predetermined number of pixels, said common display area being common to the communication conference terminal and the remote terminal;

determining means for determining coordinates of display data corresponding to the handwritten input signals transmitted between the communication conference terminal and the remote terminal through a communication between the communication conference terminal and the remote terminal through the communication line; and third means for performing a display of the display data on the common display area of the display unit of the communication conference terminal based on the determined coordinates.

9. A communication conference method between first and second terminals which use display units in order to display handwritten inputs, comprising the steps of:

exchanging information through a communication line concerning members of pixels of the display units between the first and second terminals;

determining coordinates of display data corresponding to the handwritten input signals transmitted between the first and second terminals based on the exchanged information of the number of pixels of the display units exchanged between the first and second terminals; and transmitting the display data between the first and second terminals based on the determined coordinates.

10. A communication conference method which uses display units in order to display handwritten inputs, wherein handwritten input signals are transmitted between first and second terminals to perform a communication conference session, said communication conference method comprising the steps of:

exchanging information concerning numbers of pixels of the display units between the first and second terminals; and setting a common display area used in said communication conference session, said common display area having the smaller of the number of pixels of the first terminal and the number of pixels of the second terminal.

11. A communication conference method which uses display units in order to display handwritten inputs, wherein handwritten input signals are transmitted between first and second terminals to perform a communication conference session, said communication conference method comprising the steps of:

exchanging information through a communication line concerning numbers of pixels of the display units between the first and second terminals;

setting, at the first and second terminals, a common display area having a predetermined number of pixels; and performing a display of handwritten inputs on common display areas of the display units of the first and second terminals.

12. A communication conference terminal which uses a display unit in order to display handwritten inputs, wherein handwritten input signals are transmitted between the communication conference terminal and a remote terminal to perform a communication conference session, said communication conference terminal comprising:

first means for exchanging information concerning numbers of pixels of the display units between the communication conference terminal and the remote terminal; and second means for setting a common display area used in said communication conference session, said common display area having the smaller of the number of pixels of the communication conference terminal and the number of pixels of the remote terminal.

13. A communication conference terminal which uses a display unit in order to display handwritten inputs, wherein handwritten input signals are transmitted between the communication conference terminal and a remote terminal to perform a communication conference session, said communication conference terminal comprising:

first mean for exchanging information through a communication line concerning numbers of pixels of the display units between the first and second terminals;

second means for setting a common display area having a predetermined number of pixels, said common display area being common to the communication conference terminal and the remote terminal; and third means for performing a display of handwritten inputs on the common display area of the display unit of the communication conference terminal.

14. A communication conference method between first and second terminals which use display units in order to display handwritten inputs, comprising the steps of:

exchanging information concerning members of pixels of the display units between the first and second terminals; and transmitting handwritten inputs between the first and second terminals based on the exchanged information.

* * * * *